US012693672B2

(12) United States Patent
Leung et al.

(10) Patent No.: US 12,693,672 B2
(45) Date of Patent: Jul. 28, 2026

(54) ENHANCED USER INTERFACE GENERATION FOR PARKING BASED ON OCCUPANCY MACHINE LEARNING MODELS

(71) Applicant: Tesla, Inc., Austin, TX (US)

(72) Inventors: Brandon Leung, Austin, TX (US);
Nicholas Kouris, Austin, TX (US);
Lewey Geselowitz, Austin, TX (US);
Lauren Yang, Austin, TX (US);
Nishant Desai, Austin, TX (US);
Pengfei Phil Duan, Austin, TX (US)

(73) Assignee: Tesla, Inc., Austin, TX (US)

( * ) Notice: Subject to any disclaimer, the term of this patent is extended or adjusted under 35 U.S.C. 154(b) by 64 days.

(21) Appl. No.: 18/777,322

(22) Filed: Jul. 18, 2024

(65) Prior Publication Data

US 2025/0028326 A1     Jan. 23, 2025

Related U.S. Application Data

(60) Provisional application No. 63/515,033, filed on Jul. 21, 2023.

(51) Int. Cl.
| | |
|---|---|
| *G05D 1/224* | (2024.01) |
| *G06T 7/564* | (2017.01) |
| *G06T 7/70* | (2017.01) |
| *G06V 20/56* | (2022.01) |

(52) U.S. Cl.
CPC ........... *G05D 1/2245* (2024.01); *G06T 7/564* (2017.01); *G06T 7/70* (2017.01); *G06V 20/56* (2022.01)

(58) Field of Classification Search
CPC ........ B60K 35/22; B60K 35/39; B60K 35/28; G06T 7/74; G08G 1/167; G01S 7/62; G10H 1/00; H04Q 11/0478; B60W 60/0016
See application file for complete search history.

(56) References Cited

U.S. PATENT DOCUMENTS

| | | | | |
|---|---|---|---|---|
| 6,731,608 | B2 * | 5/2004 | Iliadis | H04Q 11/0478 |
| | | | | 370/252 |
| 11,067,688 | B2 * | 7/2021 | Matsuura | G01S 7/62 |
| 11,827,241 | B2 * | 11/2023 | Seccamonte | B60W 60/0016 |

(Continued)

FOREIGN PATENT DOCUMENTS

| | | | | |
|---|---|---|---|---|
| JP | | 5277814 B2 * | 8/2013 | G10H 1/00 |

OTHER PUBLICATIONS

International Search Report and Written Opinion issued in International Application No. PCT/US24/38524 dated Sep. 27, 2024 (15 Pages).

*Primary Examiner* — Yuri Kan

(74) *Attorney, Agent, or Firm* — Foley & Lardner LLP

(57) ABSTRACT

Systems and methods for enhanced user interface generation for parking based on occupancy machine learning model. An example method includes obtaining images from a multitude of image sensors positioned about a vehicle; computing a forward pass through an occupancy network to output, at least, information reflecting, for individual angular ranges about the vehicle, whether an object is within a threshold distance of the vehicle for an individual range along with an estimated distance to the object; and causing presentation, via a display of the vehicle, of a user interface depicting a graphical representation of the vehicle and the output information.

20 Claims, 13 Drawing Sheets

(56) References Cited

U.S. PATENT DOCUMENTS

| | | | | |
|---|---|---|---|---|
| 2001/0015958 A1* | 8/2001 | Iliadis | ............... | H04Q 11/0478 |
| | | | | 370/238 |
| 2012/0262580 A1* | 10/2012 | Huebner | ............... | G08G 1/167 |
| | | | | 348/148 |
| 2018/0120561 A1* | 5/2018 | Liu | ........................... | G06T 7/74 |
| 2018/0339654 A1* | 11/2018 | Kim | ....................... | B60K 35/28 |
| 2022/0116574 A1* | 4/2022 | Kakimaru | .............. | B60K 35/29 |

* cited by examiner

Figure 1B:
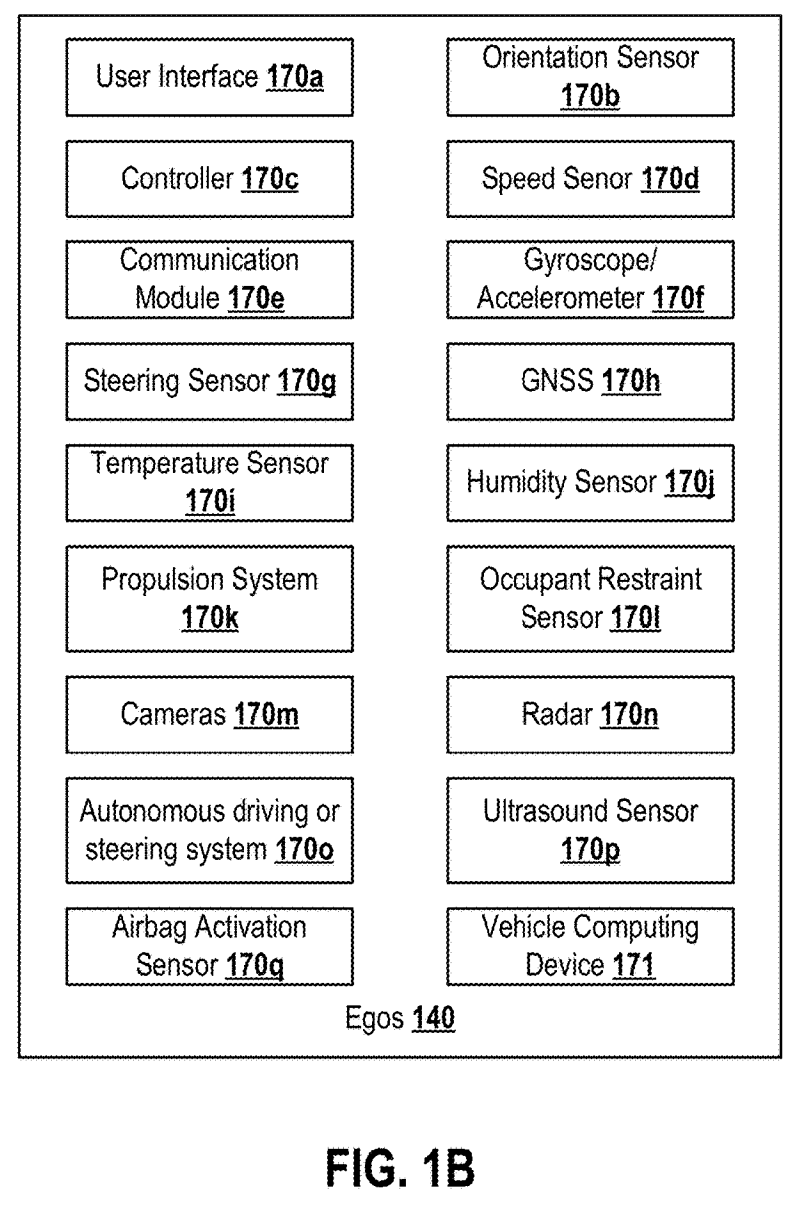

User Interface 170a

Orientation Sensor 170b

Controller 170c

Speed Senor 170d

Communication Module 170e

Gyroscope/ Accelerometer 170f

Steering Sensor 170g

GNSS 170h

Temperature Sensor 170i

Humidity Sensor 170j

Propulsion System 170k

Occupant Restraint Sensor 170l

Cameras 170m

Radar 170n

Autonomous driving or steering system 170o

Ultrasound Sensor 170p

Airbag Activation Sensor 170q

Vehicle Computing Device 171

Egos 140

Obstacle occupancy information 224

Occupancy network 217

Occupancy engine 219

Transformer engine 218

Alignment engine 220

Occupancy head 222

Features 216

Autonomous driving system 202

200b

Graphical user interface 230

Ego 232

Range A 236

Obstacle A
234

Obstacle B
238

Display screen
228

User interface data
226

Obstacle classification 224a

256

256

256

1
1
·  ·  ·  ·

1.8
1.9
·  ·  ·  ·

Obstacle distance 224n

Obstacle occupancy information
224

Autonomous driving
system 202

300

700

Receive data associated with a
first image
702

Determine a plurality of
distances to one or more objects
relative to the robotic system
704

Generate a graphical user
interface based on the plurality of
distances
706

Provide data associated with the
graphical user interface
708

ENHANCED USER INTERFACE GENERATION FOR PARKING BASED ON OCCUPANCY MACHINE LEARNING MODELS

CROSS-REFERENCE TO RELATED APPLICATIONS

The present application claims priority to U.S. Provisional Application No. 63/515,033, filed on Jul. 21, 2023, the contents of which are incorporated herein by reference in their entirety and for all purposes.

TECHNICAL FIELD

The present disclosure relates to the development and implementation of machine learning models, and more particularly, to the development and implementation of machine learning models to update a user interface to indicate one or more aspects about a relative position of an object as compared to another object.

BACKGROUND

Neural networks are relied upon for disparate uses and are increasingly forming the underpinnings of technology. For example, a neural network can be leveraged to perform object classification on an image obtained via a user device (e.g., a smart phone). In this example, the neural network can represent a convolutional neural network which applies convolutional layers, pooling layers, and one or more fully-connected layers to classify objects depicted in the image. As another example, a neural network can be leveraged for translation of text between languages. For this example, the neural network can represent a recurrent-neural network.

Complex neural networks are additionally being used to enable autonomous or semi-autonomous driving functionality for vehicles. For example, an unmanned aerial vehicle can leverage a neural network, in part, to enable navigation about a real-world area. In this example, the unmanned aerial vehicle can leverage sensors to detect upcoming objects and navigate around the objects. As another example, a car or truck can execute neural network(s) to navigate about a real-world area. At present, such neural networks can rely upon costly or error-prone sensors for input. Additionally, such neural networks can lack accuracy with respect to detecting and classifying moving and stationary (e.g., fixed) objects. This can lead to, among other things, causing deficient autonomous or semi-autonomous driving performance.

SUMMARY

To facilitate the generation of user interfaces during vehicle operation, systems and methods are provided herein for generating enhanced user interfaces for parking based on occupancy machine learning models. For example, the disclosed technology relates to enhanced techniques for autonomous or semi-autonomous (collectively referred to herein as autonomous) driving of a vehicle using image sensors (e.g., cameras) positioned about the vehicle. Thus, the vehicle can navigate about a real-world area using vision-based sensor information.

This application describes a vision-based machine learning model which relies upon increased software complexity to enable a reduction in sensor-based hardware complexity while enhancing accuracy. For example, only image sensors can be used in some embodiments. Through use of image sensors, such as cameras, the described model enables a sophisticated simulacrum of human vision-based driving. As will be described, the machine learning model can obtain images from the image sensors and combine (e.g., stitch or fuse) the information included therein. For example, the information can be combined into a vector space which is then further processed by the machine learning model to extract objects, signals associated with the objects, and so on.

In some embodiments, a system is disclosed. The system can include at least one processor configured to: receive data associated with a first image and a second image, the data associated with the first image and the second image generated by one or more sensors of a robotic system; determine a plurality of distances to one or more objects relative to the robotic system based on the first image and the second image and an occupancy network, the occupancy network configured to receive the data associated with the first image and the second image as input and output the plurality of distances to the one or more objects relative to the robotic system; generate a graphical user interface based on the plurality of distances to the one or more objects relative to the robotic system, the graphical user interface comprising a representation of the robotic system and the one or more objects positioned relative to the robotic system; and provide data associated with the graphical user interface to at least one processor associated with a display screen, the data associated with the graphical user interface configured to cause the at least one processor to display the graphical user interface on the display screen.

In some implementations, the one or more processors configured to generate the graphical user interface are configured to: determine a contour of a portion of each of the one or more objects positioned relative to the robotic system; determine a placement of the contour relative to respective objects of the one or more objects positioned relative to the robotic system; and generate the graphical user interface based on the contour and the placement of the contour relative to the respective objects. the one or more processors configured to determine the contour can be configured to: determine the contour of the portion of each of the one or more objects based on the distances of the plurality of distances corresponding to each object of the one or more objects. In some implementations, the one or more processors configured to determine the contour are configured to: determine a contour profile for the contour of the portion of each of the one or more objects positioned relative to the robotic system based on the plurality of distances corresponding to each object of the one or more objects.

In some implementations, the one or more processors configured to determine the contour are configured to: determine a contour profile for the contour of the portion of each of the one or more objects positioned relative to the robotic system based on the plurality of distances corresponding to each object of the one or more objects, each contour profile represented as a gradient. The one or more processors configured to determine the plurality of distances to one or more objects relative to the robotic system can be configured to: determine a subset of distances of the plurality of distances satisfies a threshold range of distances. The one or more processors configured to generate the graphical user interface based on the plurality of distances to the one or more objects relative to the robotic system can be configured to: generate the graphical user interface based on the plurality of distances to the one or more objects that satisfy the threshold range of distances. In some implementations, the one or more processors configured to generate the graphical user interface based on the plurality of distances to the one or more objects relative to the robotic system are configured to: forgo generating the graphical user interface based on the plurality of distances to the one or more objects that do not satisfy the threshold range of distances.

In some implementations, the one or more processors configured to determine the plurality of distances to one or more objects relative to the robotic system are configured to: determine a height for each distance of the plurality of distances based on the first image and the second image; and determine that the height for each distance of the plurality of distances satisfies a threshold range of heights. The one or more processors configured to generate the graphical user interface based on the plurality of distances to the one or more objects relative to the robotic system can be configured to: generate the graphical user interface based on the plurality of distances to the one or more objects that are associated with heights that satisfy the threshold range of heights. In some implementations, the one or more processors configured to generate the graphical user interface based on the plurality of distances to the one or more objects that are associated with heights that satisfy the threshold range of heights are configured to: forgo generating the graphical user interface based on the plurality of distances to the one or more objects that are associated with heights that do not satisfy the threshold range of heights.

In another embodiment, a method is disclosed. The method can include receiving, by at least one processor, data associated with a first image and a second image, the data associated with the first image and the second image generated by one or more sensors of a robotic system; determining, by the at least one processor, a plurality of distances to one or more objects relative to the robotic system based on the first image and the second image; generating, by the at least one processor, a graphical user interface based on the plurality of distances to the one or more objects relative to the robotic system, the graphical user interface comprising a representation of the robotic system and the one or more objects positioned relative to the robotic system; and providing, by the at least one processor, data associated with the graphical user interface to at least one processor associated with a display screen, the data associated with the graphical user interface configured to cause the at least one processor to display the graphical user interface on the display screen.

In some implementations, generating the graphical user interface can include: determining, by the at least one processor, a contour of a portion of each of the one or more objects positioned relative to the robotic system; determining, by the at least one processor, a placement of the contour relative to respective objects of the one or more objects positioned relative to the robotic system; and generating, by the at least one processor, the graphical user interface based on the contour and the placement of the contour relative to the respective objects. Determining the contour can include: determining, by the at least one processor, the contour of the portion of each of the one or more objects based on the distances of the plurality of distances corresponding to each object of the one or more objects. In some implementations, determining the contour can include: determining, by the at least one processor, a contour profile for the contour of the portion of each of the one or more objects positioned relative to the robotic system based on the plurality of distances corresponding to each object of the one or more objects. In implementations, determining the contour can include: determining, by the at least one processor, a contour profile for the contour of the portion of each of the one or more objects positioned relative to the robotic system based on the plurality of distances corresponding to each object of the one or more objects, each contour profile represented as a gradient.

In some implementations, determining the plurality of distances to one or more objects relative to the robotic system can include: determining, by the at least one processor, a subset of distances of the plurality of distances satisfies a threshold range of distances. Generating the graphical user interface based on the plurality of distances to the one or more objects relative to the robotic system can include: generating, by the at least one processor, the graphical user interface based on the plurality of distances to the one or more objects that satisfy the threshold range of distances. In some implementations, generating the graphical user interface based on the plurality of distances to the one or more objects relative to the robotic system can include: forgoing generating the graphical user interface based on the plurality of distances to the one or more objects that do not satisfy the threshold range of distances.

In some implementations, determining the plurality of distances to one or more objects relative to the robotic system can include: determining, by the at least one processor, a height for each distance of the plurality of distances based on the first image and the second image; and determining, by the at least one processor, that the height for each distance of the plurality of distances satisfies a threshold range of heights. Generating the graphical user interface based on the plurality of distances to the one or more objects relative to the robotic system can include: generating, by the at least one processor, the graphical user interface based on the plurality of distances to the one or more objects that are associated with heights that satisfy the threshold range of heights. In some implementations, generating the graphical user interface based on the plurality of distances to the one or more objects that are associated with heights that satisfy the threshold range of heights can include: forgoing, by the at least one processor, generating the graphical user interface based on the plurality of distances to the one or more objects that are associated with heights that do not satisfy the threshold range of heights.

In yet another embodiment, a non-transitory computer-readable medium is disclosed. The non-transitory computer-readable medium can store instructions thereon that, when executed by one or more processors, cause the one or more processors to: receive data associated with a first image and a second image, the data associated with the first image and the second image generated by one or more sensors of a robotic system; determine a plurality of distances to one or more objects relative to the robotic system based on the first image and the second image; generate a graphical user interface based on the plurality of distances to the one or more objects relative to the robotic system, the graphical user interface comprising a representation of the robotic system and the one or more objects positioned relative to the robotic system; and provide data associated with the graphical user interface to at least one processor associated with a display screen, the data associated with the graphical user interface configured to cause the at least one processor to display the graphical user interface on the display screen.

In some implementations, the instructions that cause the one or more processors to generate the graphical user interface can cause the one or more processors to: determine a contour of a portion of each of the one or more objects positioned relative to the robotic system, determine a placement of the contour relative to respective objects of the one or more objects positioned relative to the robotic system; and generate the graphical user interface based on the contour and the placement of the contour relative to the respective objects.

In an embodiment, a method is disclosed. The method can include obtaining, by at least one processor, images from a multitude of image sensors positioned about a vehicle; computing, by the at least one processor, a forward pass through an occupancy network to output, at least, information reflecting, for individual angular ranges about the vehicle, whether an object is within a threshold distance of the vehicle for an individual range along with an estimated distance to the object; and causing, by the at least one processor presentation, via a display of the vehicle, of a user interface depicting a graphical representation of the vehicle and the output information. In some implementations, the graphical representation of the output information includes a contour positioned about the vehicle. Individual portions of the contour can correspond to individual angular ranges. In some implementations, each portion is assigned a color based on the vehicle's proximity to an object at the corresponding angular range. The graphical representation of the output information includes a contour positioned about an obstacle proximate to the vehicle. In some implementations, individual portions of the contour correspond to individual angular ranges. Each portion can be assigned a color based on the vehicle's proximity to the object at the corresponding angular range. The user interface can be updated based on time or movement of the vehicle.

By virtue of the implementation of systems and methods described herein, sensor suits for robotic systems can be simplified while maintaining or improving the accuracy of the overall system. For example, by implementing the techniques described herein, systems can more accurately determine distances to points along objects relative to a robotic system. The more accurate distances can subsequently be used to generate graphical user interfaces that provide visual indications representing the proximity of the robotic system to the one or more objects. And by more accurately determining and/or indicating the distances between the robotic system and the objects in the environment, the robotic system can be operated such that the robotic system is able to maneuver closer to the objects with a reduced chance of unintentionally coming into contact with the object, thereby improving operational safety of the robotic system.

It is to be understood that both the foregoing general description and the following detailed description are exemplary and explanatory, and are intended to provide further explanation of the embodiments described herein.

BRIEF DESCRIPTION OF THE DRAWINGS

Non-limiting embodiments of the present disclosure are described by way of example concerning the accompanying figures, which are schematic and are not intended to be drawn to scale. Unless indicated as representing the background art, the figures represent aspects of the disclosure.

FIG. 1B illustrates various sensors associated with an ego, in accordance with an embodiment.

Figure 1A:
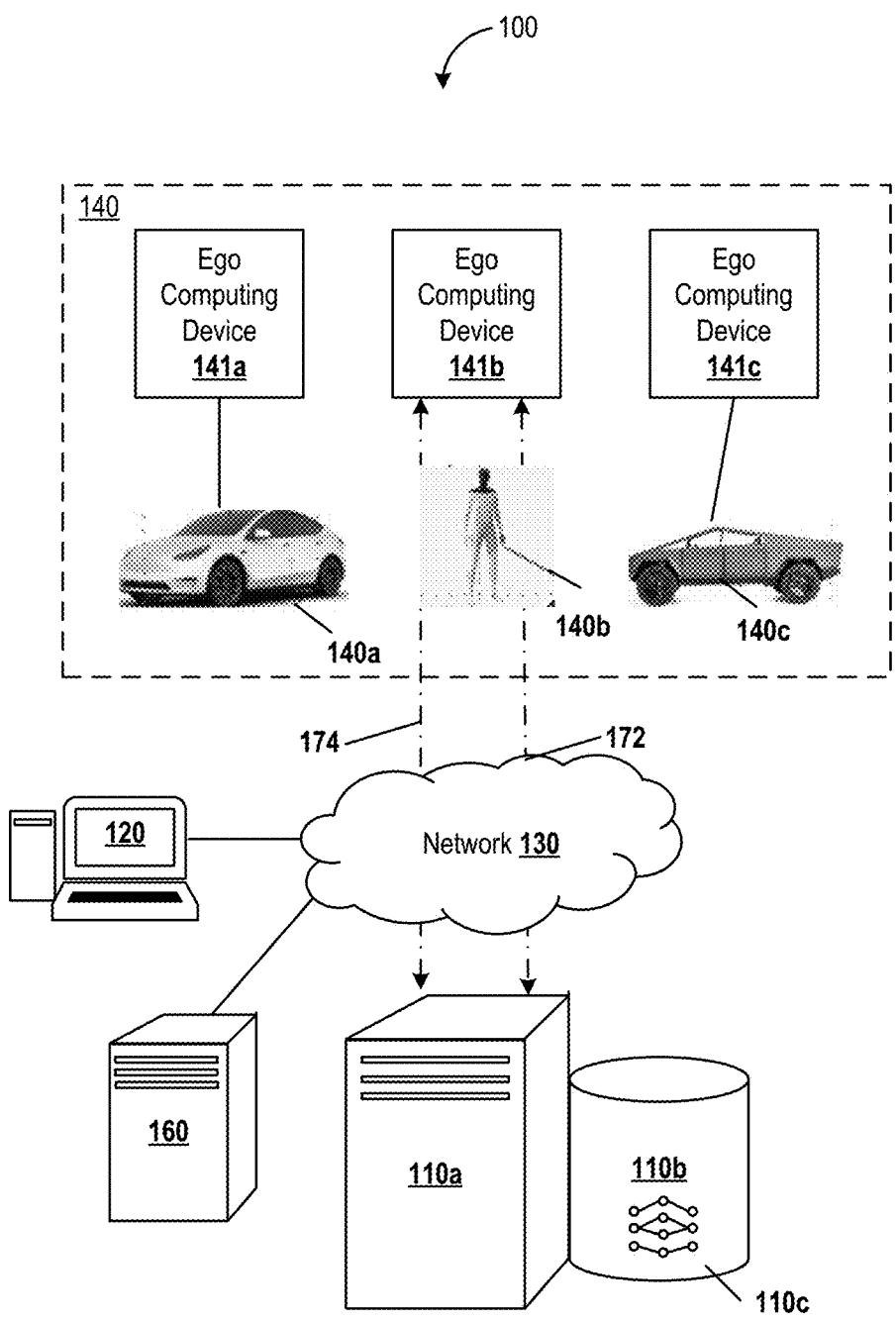
FIG. 1A illustrates components of system for collecting and analyzing data generated during vehicle operation, in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Reference will now be made to the illustrative embodiments depicted in the drawings, and specific language will be used here to describe the same. It will nevertheless be understood that no limitation of the scope of the claims or this disclosure is thereby intended. Alterations and further modifications of the features illustrated herein, and additional applications of the principles of the subject matter illustrated herein, which would occur to one skilled in the relevant art and having possession of this disclosure, are to be considered within the scope of the subject matter disclosed herein. Other embodiments can be used and/or other changes can be made without departing from the spirit or scope of the present disclosure. The illustrative embodiments described in the detailed description are not meant to be limiting to the subject matter presented.

As can be appreciated, humans are capable of driving vehicles using vision and a deep understanding of their real-world surroundings. For example, humans are capable of rapidly identifying objects (e.g., pedestrians, road signs, lane markings, vehicles, and/or the like) and using these objects to inform driving of vehicles. To further assist humans while performing driving operations, systems have been developed to assist drivers in performing certain tasks (e.g., braking), referred to as advance driver-assistance systems (or ADAS). These systems involve often involve the implementation of one or more machine learning models that are capable of identifying and characterizing objects positioned about the vehicles. However, these machine learning models can be prone to errors. For example, unsophisticated models can generate incorrect predictions about the objects and their position about the vehicle. And the generation and processing of sensor data involving disparate sensors can introduce inconsistencies that affect downstream use of the inferences generated based on the sensor data.

As will be described, the techniques described herein can be employed to help a driver operate a vehicle at one or more predetermined speeds and/or park a vehicle. Additionally, the techniques can be used as part of an autonomous or semi-autonomous driving technique operate a vehicle at one or more predetermined speeds and/or park the vehicle. As can be appreciated, parking lots typically have obstacles which drivers are required to navigate when parking their vehicles. For example, a parking spot can have bollards positioned proximate to the boundaries of the parking spots. In this example, the bollards can help protect pedestrians, infrastructure, and so on. These bollards can be difficult to reliably see, and a driver can have difficulty determining a distance from her/his vehicle to a bollard. Similarly, when parking on the street there can be cones, debris, parking meters, and so on, about which a driver is required to navigate.

An example vehicle can include an emissive sensor, such as an ultrasonic sensor, to detect distances to the above-described objects when a driver is parking. For example, the ultrasonic sensor can be included in the rear of the vehicle to determine distances to objects which are positioned behind the vehicle. In this example, as the driver backs up the vehicle can output a warning (e.g., a sound). While this sensor can provide beneficial information, the information is specific to objects located within a beam angle of the sensor. For example, this can represent 10 degrees, 15 degrees, and so on, which extends from the rear. While some vehicles can have another ultrasonic sensor at the front, parking obstacles can be located anywhere about the vehicle. It can also be impractical to include a sufficient number of ultrasonic sensors to allow for 360-degree coverage. Thus, these sensors can provide limited visibility into distances, and locations, of these objects while parking.

In contrast, the techniques described herein use image sensors which are positioned about the vehicle to provide 360-degree image data of the vehicle's surroundings. The vehicle can use machine learning techniques to identify objects proximate to the vehicle which can touch the vehicle while the vehicle is maneuvering (e.g., while parking). In some embodiments, the machine learning techniques can identify objects which are below a threshold height. Example threshold heights can include the height of the vehicle, the height of the vehicle plus a threshold distance (e.g., 0.5 meters, 1 meter). Example threshold heights can further include 0.75 meters, 1 meter, 1.2 meters, 1.5 meters, 2.5 meters, and so on. In this way, the vehicle can ensure that objects which pose a risk of hitting the vehicle can be identified.

An example machine learning technique can rely upon a neural network which is trained to classify objects in received images. For example, the neural network can include convolutional layers followed by full-connected layers trained to assign a class to an object depicted in an image. The neural network can be used to detect certain objects, such as cars, trucks, road signs, pedestrians, and so on, which are within visible range of a vehicle running the neural network.

While understanding what an object is, such as the classification, can be important to effectuate safe and reliable autonomous driving, the specific classification can be less important while parking. For example, the existence of an object can be more important than the specific type of object. In this example, a driver, or autonomous-driving system, can prefer to be identified as to any object which is proximate to the vehicle. Additionally, neural networks can assign a cuboid about classified objects. In this way, their location, size, and so on, can be determined. However, such cuboids are typically inflexible in that they are sized to broadly envelop the object. Since parking involves navigating in confined areas, there is a great benefit to understanding the actual contour or boundary of an object in a real-world environment.

The vison-based machine learning model described herein determines the occupancy of the objects in three-dimensional space. For example, and as described in U.S. Prov. Patent App. No. 63/375,199, U.S. patent application Ser. No. 18/440,764 filed on Feb. 13, 2024, and Patent Cooperation Treaty (PCT) Application No. PCT/US2023/032214 filed on Sep. 7, 2023, the contents of each of which are incorporated herein by reference in their entirety and for all purposes, the vision-based machine learning model can separate three-dimensional space into voxels which each occupy a portion of the space. The model can then indicate, at least, whether the voxel is occupied by an object. In this way, the model determines the voxels which form each object physically present in a real-world environment. Thus, oddly shaped objects, or objects which have extending members (e.g., a truck with a ladder hanging out the back), can be accurately mapped as occupying space in the voxels.

The above-described vision-based machine learning model can additionally determine information which is relevant to parking. For example, the model can separate the 360-degree surrounding of the vehicle into a threshold number of degree increments (also referred to herein as angular ranges). In this example, the 360-degree surrounding can be separated into individual ranges of azimuths. In some embodiments, there can be 72 individual ranges which are each 5 degrees. In some embodiments, there can be lesser, more, or an adjustable number of ranges. For each range, the machine learning model can output a binary classification indicating whether the range is occupied by an object. The model can also output a distance from the vehicle (e.g., from ego) to the object. This output information is described herein as obstacle occupancy information.

Figure 4:
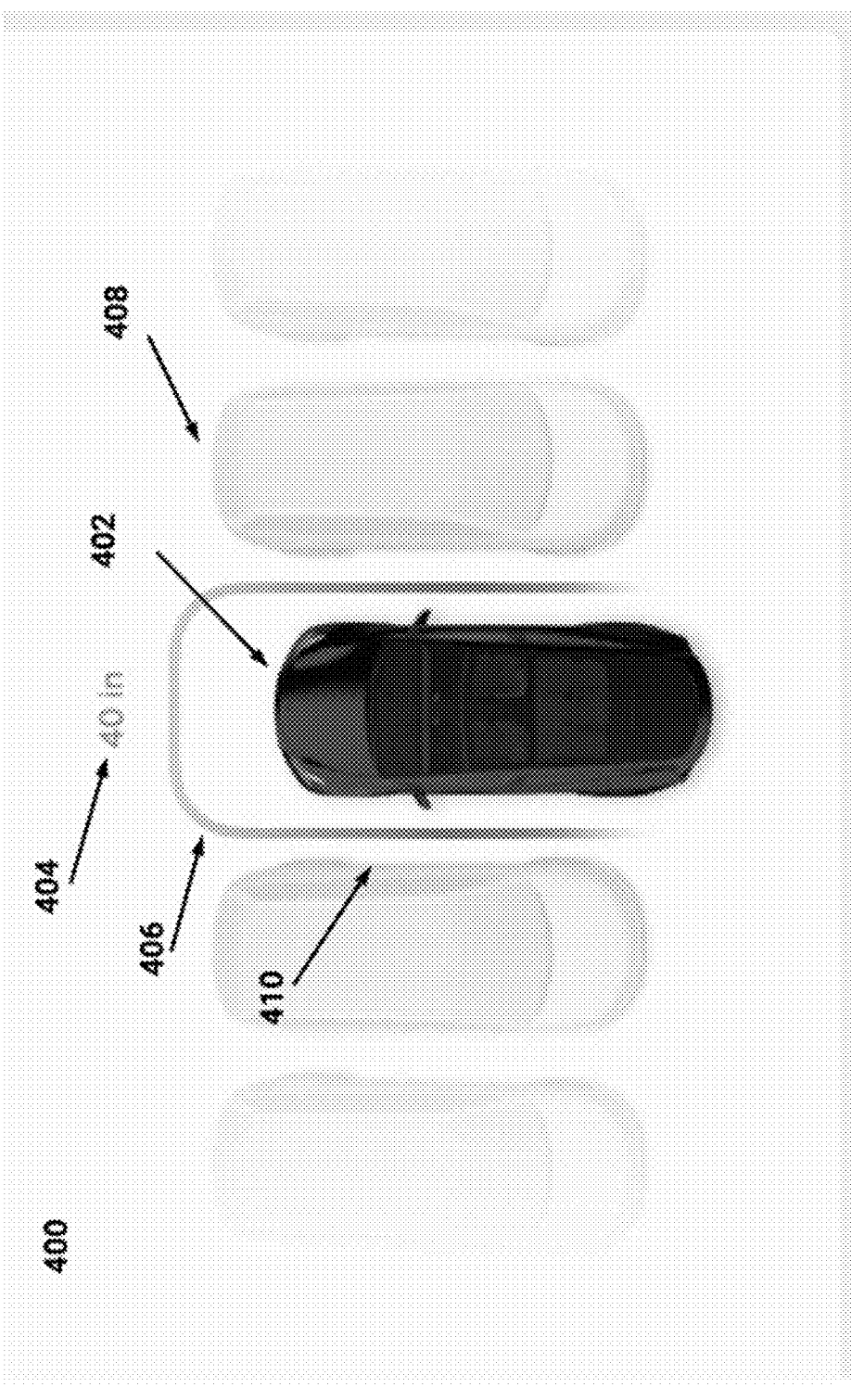
FIG. 4 is an example user interface depicting occupancy proximate to a vehicle while parking, in accordance with an embodiment.
Figure 5A:
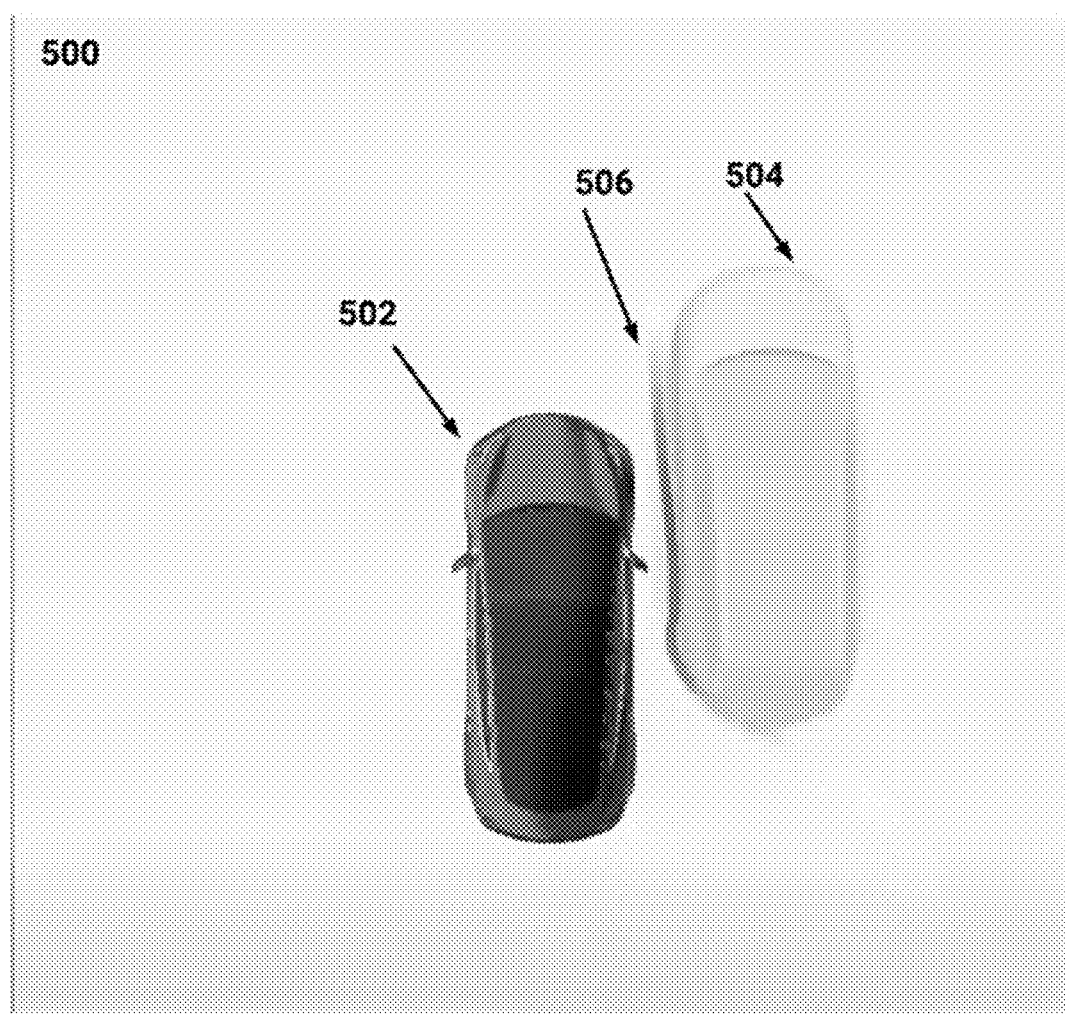
FIG. 5A illustrates an example user interface depicting occupancy proximate to a vehicle while parking, in accordance with an embodiment.
Figure 5B:
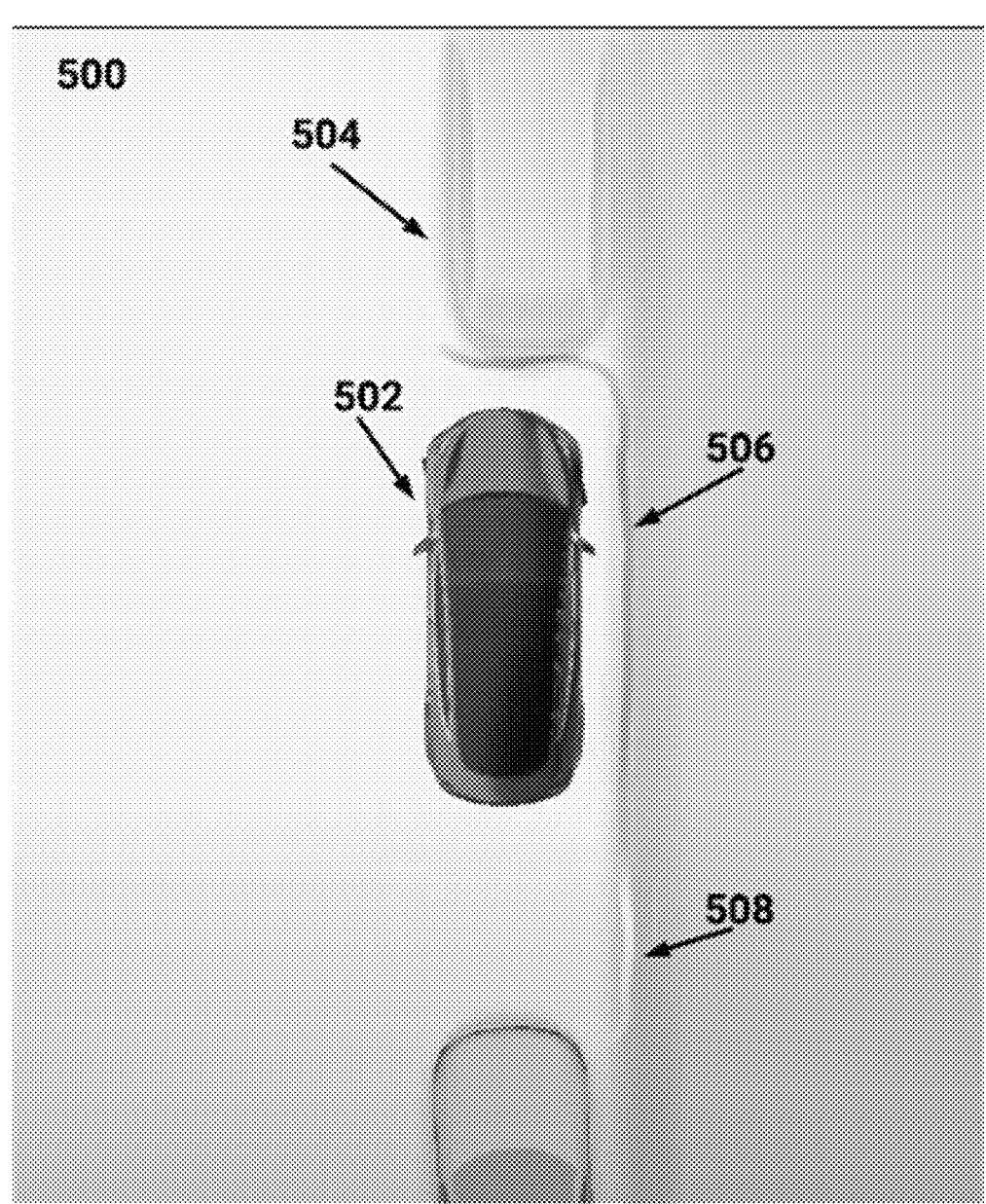
FIG. 5B illustrates the example user interface of FIG. 5A being updated based on movement of the vehicle, in accordance with an embodiment.

In some embodiments, to provide for an easier driving experience or to show the driver useful information during autonomous driving, the vehicle can present a graphical representation (e.g., a graphical user interface) of the obstacle occupancy information. For example, a display within the vehicle can depict the graphical representation during operation of the vehicle. An example graphical representation is illustrated in FIG. 4 and includes a graphical boundary about the vehicle. Portions of the graphical boundary can be assigned colors selected on each portion's proximity to an object (e.g., red can indicate an object is close to the vehicle). Another example graphical representation is illustrated in FIGS. 5A and 5B and include the graphical boundary on objects proximate to the vehicle. For example, the graphical boundary can be located proximate to a curb and portions thereof assigned colors based on the vehicle's proximity to the curb.

The disclosed technology therefore addresses technological problems. While some vehicles leveraged emissive sensors, such as ultrasonic sensors, at the front and/or rear of the vehicles, these sensors can have limited visibility into objects proximate to a vehicle. Additionally, these sensors can have variable accuracy with respect to objects positioned at different heights. For example, they can struggle to reliably detect a curb proximate to a vehicle. In contrast, the techniques described herein use image sensors to enable a 360-degree view about a vehicle which is unencumbered by the limitations of ultrasonic sensors. As a result, the output of the images sensors can be processed to determine more accurate distances to objects relative to a robotic system such as an ego, and subsequently be implemented by downstream systems when generating graphical user interfaces and/or operating the egos. These improvements likewise improve the operational safety of the robotic system, enabling operation of the robotic system closer to the objects than would otherwise be possible given the error tolerances of certain sensors (e.g., emissive sensors), described above.

While description related to an autonomous vehicle (e.g., an ego represented as a car) is included herein, as can be appreciated the techniques can be applied to other autonomous vehicles (e.g., other egos). For example, the machine learning model described herein can be used, in part, to autonomously operate unmanned ground vehicles, unmanned boats, and so on. Additionally, reference to an autonomous vehicle can, in some embodiments, represent a vehicle which can be placed into an autonomous driving mode. For example, the vehicle can autonomously drive or navigate on a highway, freeway, and so on. In some embodiments, the vehicle can autonomously drive or navigate on city roads. The vehicle can also perform automated parking in a parking lot, city streets, and so on.

Referring now to FIG. 1A, illustrated is a non-limiting example of components of a system in which the methods and systems discussed herein can be implemented. For instance, an analytics server can collect and analyze data generated during vehicle operation. The analytics server can then provide event data (described herein) to devices based on receiving requests for the event data, the requests specifying one or more event types.

With continued reference to FIG. 1A, an example environment 100 can include an analytics server 110a, a system database 110b, an administrator computing device 120, egos 140a-c (referred to collectively as "egos 140" and individually as "ego 140"), ego computing devices 141a-c (referred to collectively as "ego computing devices 141" and individually as "ego computing device 141"), and a server 160. The environment 100 is not confined to the components described herein and can include additional or other components not shown for brevity, which are to be considered within the scope of the embodiments described herein.

The components mentioned herein can interconnect (e.g., establish a connection to communicate) through a network 130. Examples of the network 130 can include, but are not limited to, private or public LAN, WLAN, MAN, WAN, and the Internet. The network 130 can include wired and/or wireless connections that facilitate communications according to one or more standards and/or via one or more transport mediums.

The communication over the network 130 can be performed in accordance with various communication protocols such as Transmission Control Protocol and Internet Protocol (TCP/IP), User Datagram Protocol (UDP), and IEEE communication protocols. In one example, the network 130 can include wireless communications according to Bluetooth specification sets or another standard or proprietary wireless communication protocol. In another example, the network 130 can also include communications over a cellular network, including, for example, a GSM (Global System for Mobile Communications), CDMA (Code Division Multiple Access), or an EDGE (Enhanced Data for Global Evolution) network.

The environment 100 illustrates an example of a system architecture and components that can be used to train and execute one or more AI models, such the AI model(s) 110c. Specifically, as depicted in FIG. 1A and described herein, the analytics server 110a can use the methods discussed herein to train the AI model(s) 110c using data retrieved from the egos 140 (e.g., by using data streams 172 and 174). When the AI model(s) 110c have been trained, each of the egos 140 can have access to and execute the trained AI model(s) 110c. For instance, the ego 140a having the ego computing device 141a can transmit its camera feed to the trained AI model(s) 110c and can generate a graph defining lane segments in the environment (e.g., data stream 174). Moreover, the data ingested and/or predicted by the AI model(s) 110c with respect to the egos 140 (at inference time) can also be used to improve the AI model(s) 110c. Therefore, the environment 100 depicts a continuous loop that can periodically improve the accuracy of the AI model(s) 110c. Moreover, the environment 100 depicts a loop in which data received the egos 140 can be used to at training phase in addition to the inference phase.

The analytics server 110a can be configured to collect, process, and analyze navigation data (e.g., images captured while navigating) and various sensor data collected from the egos 140. The collected data can then be processed and prepared into a training dataset. The training dataset can then be used to train one or more AI models, such as the AI model 110c. The analytics server 110a can also be configured to collect visual data from the egos 140. Using the AI model 110c (trained using the methods and systems discussed herein), the analytics server 110a can generate a dataset and/or an occupancy map for the egos 140. The analytics server 110a can display the occupancy map on the egos 140 and/or transmit the occupancy map/dataset to the ego computing devices 141, the administrator computing device 120, and/or the server 160.

In FIG. 1A, the AI model 110c is illustrated as a component of the system database 110b, but the AI model 110c can be stored in a different or a separate component, such as cloud storage or any other data repository accessible to the analytics server 110a.

The analytics server 110a can also be configured to display an electronic platform illustrating various training attributes for training the AI model 110c. The electronic platform can be displayed on the administrator computing device 120, such that an analyst can monitor the training of the AI model 110c. An example of the electronic platform generated and hosted by the analytics server 110a can be a web-based application or a website configured to display the training dataset collected from the egos 140 and/or training status/metrics of the AI model 110c.

The analytics server 110a can be any computing device comprising a processor and non-transitory machine-readable storage capable of executing the various tasks and processes described herein. Non-limiting examples of such computing devices can include workstation computers, laptop computers, server computers, and the like. While the environment 100 includes a single analytics server 110a, the environment 100 can include any number of computing devices operating in a distributed computing environment, such as a cloud environment.

The egos 140 can represent various systems that include electronic data sources that transmit data associated with their previous or current navigation sessions to the analytics server 110a. The egos 140 can be any apparatus configured for navigation, such as a vehicle 140a and/or a truck 140c. The egos 140 are not limited to being vehicles and can include robotic devices as well. For instance, the egos 140 can include a robot 140b, which can represent a general purpose, bipedal, autonomous humanoid robot capable of navigating various terrains. The robot 140b can be equipped with software that enables balance, navigation, perception, or interaction with the physical world. The robot 140*b* can also include various cameras configured to transmit visual data to the analytics server 110*a*.

In some embodiments, the egos 140 can include one or more electric motors which cause movement of the egos 140. The electric motors can include, for example, induction motors, permanent magnet motors, and/or the like. Batteries (e.g., one or more battery packs each comprising a multitude of batteries) can be used to power the electric motors. The egos 140 can further include a propulsion system usable to set a gear (e.g., a propulsion direction) for the vehicle. With respect to an electric vehicle, the propulsion system can adjust operation of the electric motor to change propulsion direction. Additionally, the egos 140 can include the autonomous driving systems described herein which can processes data, such as images received from cameras positioned about the egos 140. The processor system 120 can additionally output information to, and receive information (e.g., user input) from, a display included in the vehicle. For example, the display can present the user interface 400 illustrated in FIG. 4, the user interface 500 illustrated in FIGS. 5A-5B, and so on.

Even though referred to herein as an "ego," the egos 140 may or may not be autonomous devices configured for automatic navigation. For instance, in some embodiments, the ego 140 can be controlled by a human operator or by a remote processor. The ego 140 can include various sensors, such as the sensors depicted in FIG. 1B. The sensors can be configured to collect data as the egos 140 navigate various terrains (e.g., roads). The analytics server 110*a* can collect data provided by the egos 140. For instance, the analytics server 110*a* can obtain navigation session and/or road/terrain data (e.g., images of the egos 140 navigating roads) from various sensors, such that the collected data is eventually used by the AI model 110*c* for training purposes.

As used herein, a navigation session corresponds to a trip where egos 140 travel a route, regardless of whether the trip was autonomous or controlled by a human. In some embodiments, the navigation session can be for data collection and model training purposes. However, in some other embodiments, the egos 140 can refer to a vehicle purchased by a consumer and the purpose of the trip can be categorized as everyday use. The navigation session can start when the egos 140 move from a non-moving position beyond a threshold distance (e.g., 0.1 miles, 100 feet) or exceed a threshold speed (e.g., over 0 mph, over 1 mph, over 5 mph). The navigation session can end when the egos 140 are returned to a non-moving position and/or are turned off (e.g., when a driver exits a vehicle).

The egos 140 can represent a collection of egos monitored by the analytics server 110*a* to train the AI model(s) 110*c*. For instance, a driver for the vehicle 140*a* can authorize the analytics server 110*a* to monitor data associated with their respective vehicle. As a result, the analytics server 110*a* can utilize various methods discussed herein to collect sensor/camera data and generate a training dataset to train the AI model(s) 110*c* accordingly. The analytics server 110*a* can then execute the trained AI model(s) 110*c* to analyze data associated with the egos 140 and to predict an occupancy map for the egos 140. Moreover, additional/ongoing data associated with the egos 140 can also be processed and added to the training dataset, such that the analytics server 110*a* re-calibrates the AI model(s) 110*c* accordingly. Therefore, the environment 100 depicts a loop in which navigation data received from the egos 140 can be used to train the AI model(s) 110*c*. The egos 140 can include processors that execute the trained AI model(s) 110*c* for navigational purposes. While navigating, the egos 140 can collect additional data regarding their navigation sessions, and the additional data can be used to calibrate the AI model(s) 110*c*. That is, the egos 140 represent egos that can be used to train, execute/use, and re-calibrate the AI model(s) 110*c*. In a non-limiting example, the egos 140 represent vehicles purchased by customers that can use the AI model(s) 110*c* to autonomously navigate while simultaneously improving the AI model(s) 110*c*.

The egos 140 can be equipped with various technology allowing the egos to collect data from their surroundings and (possibly) navigate autonomously. For instance, the egos 140 can be equipped with inference chips to run self-driving software.

Figure 1C:
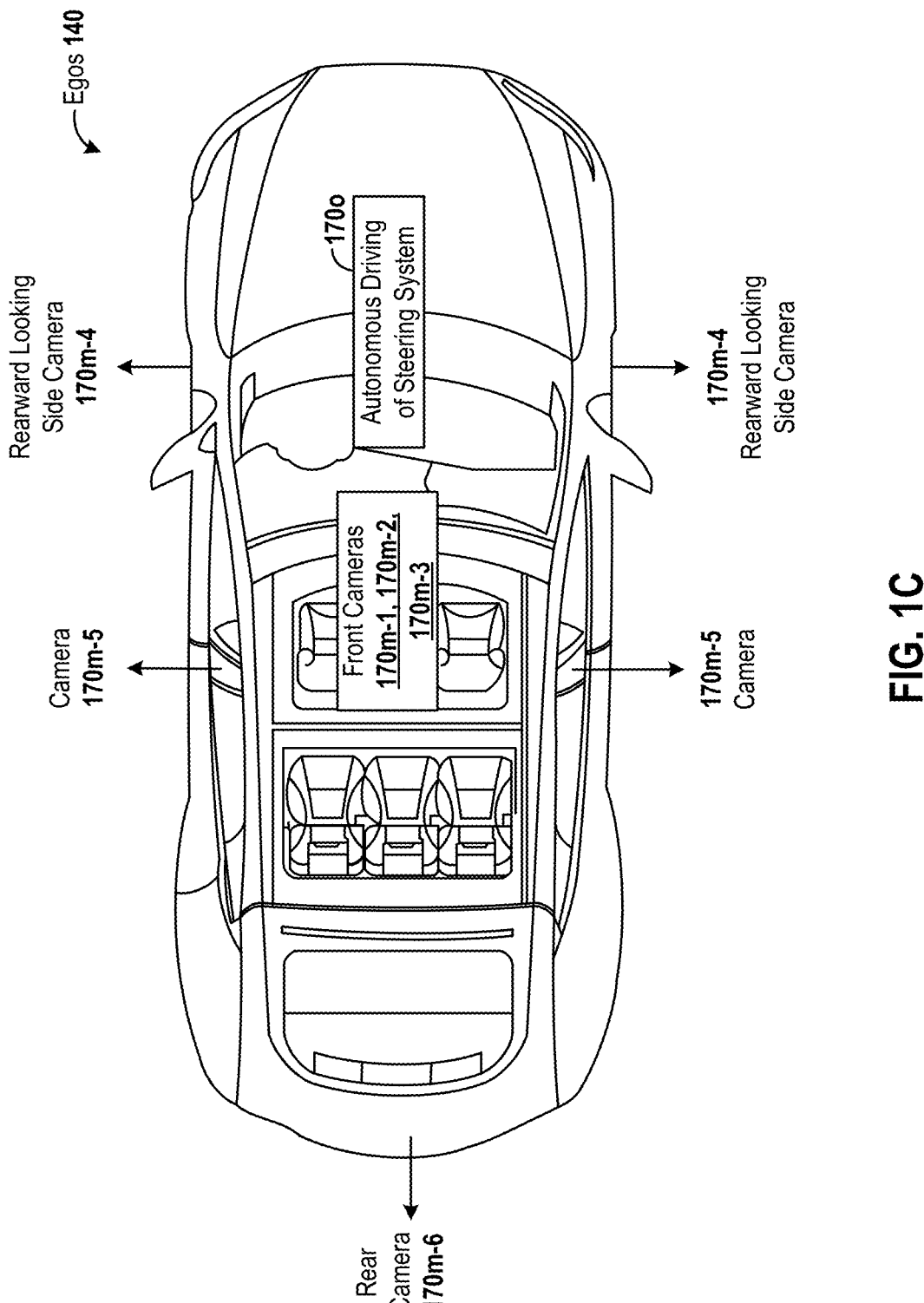
FIG. 1C illustrates the components of a vehicle, in accordance with an embodiment.

Various sensors for each ego 140 can monitor and transmit the collected data associated with different navigation sessions to the analytics server 110*a*. FIGS. 1B and 1C illustrate block diagrams of sensors integrated within the egos 140, according to an embodiment. The number and position of each sensor discussed with respect to FIGS. 1B and 1C can depend on the type of ego discussed in FIG. 1A. For instance, the robot 140*b* can include different sensors than the vehicle 140*a* or the truck 140*c*. For instance, the robot 140*b* can not include the airbag activation sensor 170*q*. Moreover, the sensors of the vehicle 140*a* and the truck 140*c* can be positioned differently than illustrated in FIG. 1C.

As discussed herein, various sensors integrated within each ego 140 can be configured to measure various data associated with each navigation session. The analytics server 110*a* can periodically collect data monitored and collected by these sensors, wherein the data is processed in accordance with the methods described herein and used to train the AI model 110*c* and/or execute the AI model 110*c* to generate the occupancy map.

With reference to FIG. 1B, the egos 140 can include a user interface 170*a*. The user interface 170*a* can refer to a user interface of an ego computing device (e.g., the ego computing devices 141 in FIG. 1A). The user interface 170*a* can be implemented as a display screen integrated with or coupled to the interior of a vehicle, a heads-up display, a touchscreen, or the like. The user interface 170*a* can include an input device, such as a touchscreen, knobs, buttons, a keyboard, a mouse, a gesture sensor, a steering wheel, or the like. In various embodiments, the user interface 170*a* can be adapted to provide user input (e.g., as a type of signal and/or sensor information) to other devices or sensors of the egos 140 (e.g., sensors illustrated in FIG. 1B), such as a controller 170*c*.

The user interface 170*a* can also be implemented with one or more logic devices that can be adapted to execute instructions, such as software instructions, implementing any of the various processes and/or methods described herein. For example, the user interface 170*a* can be adapted to form communication links, transmit and/or receive communications (e.g., sensor signals, control signals, sensor information, user input, and/or other information), or perform various other processes and/or methods. In another example, the driver can use the user interface 170*a* to control the temperature of the egos 140 or activate its features (e.g., autonomous driving or steering system 170*o* which is sometimes referred to as a processor system). Therefore, the user interface 170*a* can monitor and collect driving session data in conjunction with other sensors described herein. The user interface 170*a* can also be configured to display various data generated/predicted by the analytics server 110*a* and/or the AI model 110*c*.

An orientation sensor 170b can be implemented as one or more of a compass, float, accelerometer, and/or other digital or analog device capable of measuring the orientation of the egos 140 (e.g., magnitude and direction of roll, pitch, and/or yaw, relative to one or more reference orientations such as gravity and/or magnetic north). The orientation sensor 170b can be adapted to provide heading measurements for the egos 140. In other embodiments, the orientation sensor 170b can be adapted to provide roll, pitch, and/or yaw rates for the egos 140 using a time series of orientation measurements. The orientation sensor 170b can be positioned and/or adapted to make orientation measurements in relation to a particular coordinate frame of the egos 140.

A controller 170c can be implemented as any appropriate logic device (e.g., processing device, microcontroller, processor, application-specific integrated circuit (ASIC), field programmable gate array (FPGA), memory storage device, memory reader, or other device or combinations of devices) that can be adapted to execute, store, and/or receive appropriate instructions, such as software instructions implementing a control loop for controlling various operations of the egos 140. Such software instructions can also implement methods for processing sensor signals, determining sensor information, providing user feedback (e.g., through user interface 170a), querying devices for operational parameters, selecting operational parameters for devices, or performing any of the various operations described herein.

A communication module 170e can be implemented as any wired and/or wireless interface configured to communicate sensor data, configuration data, parameters, and/or other data and/or signals to any feature shown in FIG. 1A (e.g., analytics server 110a). As described herein, in some embodiments, communication module 170e can be implemented in a distributed manner such that portions of communication module 170e are implemented within one or more elements and sensors shown in FIG. 1B. In some embodiments, the communication module 170e can delay communicating sensor data. For instance, when the egos 140 do not have network connectivity, the communication module 170e can store sensor data within temporary data storage and transmit the sensor data when the egos 140 are identified as having proper network connectivity.

A speed sensor 170d can be implemented as an electronic pitot tube, metered gear or wheel, water speed sensor, wind speed sensor, wind velocity sensor (e.g., direction and magnitude), and/or other devices capable of measuring or determining a linear speed of the egos 140 (e.g., in a surrounding medium and/or aligned with a longitudinal axis of the egos 140) and providing such measurements as sensor signals that can be communicated to various devices.

A gyroscope/accelerometer 170f can be implemented as one or more electronic sextants, semiconductor devices, integrated chips, accelerometer sensors, or other systems or devices capable of measuring angular velocities/accelerations and/or linear accelerations (e.g., direction and magnitude) of the egos 140, and providing such measurements as sensor signals that can be communicated to other devices, such as the analytics server 110a. The gyroscope/accelerometer 170f can be positioned and/or adapted to make such measurements in relation to a particular coordinate frame of the egos 140. In various embodiments, the gyroscope/accelerometer 170f can be implemented in a common housing and/or module with other elements depicted in FIG. 1B to ensure a common reference frame or a known transformation between reference frames.

A global navigation satellite system (GNSS) 170h can be implemented as a global positioning satellite receiver and/or another device capable of determining absolute and/or relative positions of the egos 140 based on wireless signals received from space-born and/or terrestrial sources, for example, and capable of providing such measurements as sensor signals that can be communicated to various devices. In some embodiments, the GNSS 170h can be adapted to determine the velocity, speed, and/or yaw rate of the egos 140 (e.g., using a time series of position measurements), such as an absolute velocity and/or a yaw component of an angular velocity of the egos 140.

A temperature sensor 170i can be implemented as a thermistor, electrical sensor, electrical thermometer, and/or other devices capable of measuring temperatures associated with the egos 140 and providing such measurements as sensor signals. The temperature sensor 170i can be configured to measure an environmental temperature associated with the egos 140, such as a cockpit or dash temperature, for example, which can be used to estimate a temperature of one or more elements of the egos 140.

A humidity sensor 170j can be implemented as a relative humidity sensor, electrical sensor, electrical relative humidity sensor, and/or another device capable of measuring a relative humidity associated with the egos 140 and providing such measurements as sensor signals.

A steering sensor 170g can be adapted to physically adjust a heading of the egos 140 according to one or more control signals and/or user inputs provided by a logic device, such as controller 170c. Steering sensor 170g can include one or more actuators and control surfaces (e.g., a rudder or other type of steering or trim mechanism) of the egos 140 and can be adapted to physically adjust the control surfaces to a variety of positive and/or negative steering angles/positions. The steering sensor 170g can also be adapted to sense a current steering angle/position of such steering mechanism and provide such measurements.

A propulsion system 170k can be implemented as a propeller, turbine, or other thrust-based propulsion system, a mechanical wheeled and/or tracked propulsion system, a wind/sail-based propulsion system, and/or other types of propulsion systems that can be used to provide motive force to the egos 140. The propulsion system 170k can also monitor the direction of the motive force and/or thrust of the egos 140 relative to a coordinate frame of reference of the egos 140. In some embodiments, the propulsion system 170k can be coupled to and/or integrated with the steering sensor 170g.

An occupant restraint sensor 170l can monitor seatbelt detection and locking/unlocking assemblies, as well as other passenger restraint subsystems. The occupant restraint sensor 170l can include various environmental and/or status sensors, actuators, and/or other devices facilitating the operation of safety mechanisms associated with the operation of the egos 140. For example, occupant restraint sensor 170l can be configured to receive motion and/or status data from other sensors depicted in FIG. 1B. The occupant restraint sensor 170l can determine whether safety measurements (e.g., seatbelts) are being used.

Cameras 170m can refer to one or more cameras integrated within the egos 140 and can include multiple cameras integrated (or retrofitted) into the ego 140, as depicted in FIG. 1C. The cameras 170m can be interior- or exterior-facing cameras of the egos 140. For instance, as depicted in FIG. 1C, the egos 140 can include one or more interior-facing cameras that can monitor and collect footage of the occupants of the egos 140. The egos 140 can include eight exterior facing cameras. For example, the egos 140 can include a front camera 170m-1, a forward-looking side camera 170*m*-2, a forward-looking side camera 170*m*-3, a rearward looking side camera 170*m*-4 on each front fender, a camera 170*m*-5 (e.g., integrated within a B-pillar) on each side, and a rear camera 170*m*-6. In some embodiments, the cameras 170*m* can generate sensor data that is used by the autonomous driving or steering system 170*o* (also referred to as autonomous driving system 170*o*) to generate a 360-degree view around the egos 140. While the present disclosure is described with respect to the generation of data by one or more cameras 170*m*, in some embodiments, sensor data generated by one or more other types of sensors (e.g., light detection and ranging (LiDAR) sensors, radar sensors 170*n*, ultrasound sensors 170*p*, and/or the like can be used to generate data associated with the environment in which the egos 140 operate and processed in accordance with the techniques described herein.

In some embodiments, one or more of the cameras 170*m* can be positioned in a camera housing near the top of the windshield of the egos 140. For example, a camera 170*m* can provide a forward view of a real-world environment in which the vehicle is driving. In an example, a camera 170*m* can include three image sensors which are laterally offset from each other. For example, the camera housing can include three image sensors which point forward relative to the egos 140. In this example, a first camera 170*m* can have a wide-angled (e.g., fish-eye) lens. A second camera 170*m* can have a normal or standard lens (e.g., 35 mm equivalent focal length, 50 mm equivalent, and/or the like). A third camera 170*m* can have a zoom or narrow-view lens. In this way, three images of varying focal lengths can be obtained in the forward direction relative to the egos 140.

In some embodiments, one or more cameras 170*m* can be rear-facing and positioned on the left side of the egos 140. For example, a camera 170*m* can be placed on a portion of the fender of the egos 140. Similarly, a camera 170*m* can be rear-facing and positioned on the right side of the egos 140. For example, a camera 170*m* can be placed on a portion of the fender of the egos 140.

In some embodiments, a camera 170*m* can be positioned on a door pillar of the egos 140 on the left side and/or the right side of the egos 140. This camera 170*m* can be angled such that the camera 170*m* points downward relative to the egos 140 and, at least in part, forward. In some embodiments, the cameras 170*m* can be angled such that the cameras 170*m* point downward and, at least in part, rearward. Similarly, the camera 170*m* can be positioned on a door pillar of the vehicle 100 on the right side. As described above, the cameras 170*m* can be angled such that the cameras 170*m* point downwards and either forward or rearward in part.

In some embodiments, the camera 170*m* can be positioned such that the cameras 170*m* point behind the egos 140 and obtain images in the rear direction of the egos 140 (e.g., assuming the egos 140 are moving forward). In some embodiments, the cameras 170*m* can be placed above a license plate of the egos 140.

In some embodiments, the cameras 170*m*, the radar 170*n*, and/or the ultrasound sensors 170*p* can generate data in accordance with a particular frequency, such as 30 Hz, 36 Hz, 51 Hz, 65 Hz, and/or the like. In examples, the sensor data can be generated in varying frequencies based on the sensor and/or placement of the sensor used to generate the sensor data. As described below, the sensor data generated by the sensors described herein can be processed by the autonomous driving system 170*o* to determine occupancy information associated with a real-world environment about the egos 140.

In some embodiments, a radar 170*n* and ultrasound sensors 170*p* can be configured to monitor the distance of the egos 140 to other objects, such as other vehicles or immobile objects (e.g., trees or garage doors). The egos 140 can also include an autonomous driving system 170*o* configured to use data collected via various sensors (e.g., radar 170*n*, speed sensor 170*d*, and/or ultrasound sensors 170*p*) to autonomously navigate the ego 140.

With continued reference to FIG. 1B, the autonomous driving system 170*o* can include and/or be implemented by a computing device that is the same as, or similar to, the vehicle computing device 171. In some embodiments, the autonomous driving system 170*o* can analyze various data collected by one or more sensors described herein to identify driving data. For instance, autonomous driving system 170*o* can receive sensor data generated by one or more sensors described herein (e.g., cameras 170*m*, radar 170*n*, ultrasound sensors 170*p*, and/or the like and calculate a risk of forward collision based on the speed of the ego 140 and its distance to another vehicle on the road. The autonomous driving system 170*o* can also determine whether the driver is touching the steering wheel. The autonomous driving system 170*o* can transmit the analyzed data to various features discussed herein, such as the analytics server 110*a*.

In some embodiments, the autonomous driving system 170*o* can obtain images from the cameras 170*m* and detect objects, and information associated with the objects, using the vision-based machine learning models described herein. Based on the objects, the autonomous driving system 170*o* can adjust one or more driving characteristics or features. For example, the autonomous driving system 170*o* can cause the egos 140 to turn, slow down, brake, speed up, and so on. The autonomous driving system 170*o* can also render, or cause rendering of, user interfaces for presentation via a display. Example user interfaces are included in FIGS. 4-5B.

In some embodiments, the autonomous driving system 170*o* can include one or more matrix processors which are configured to rapidly process information associated with machine learning models. The autonomous driving system 170*o* can be used to perform convolutions associated with forward passes through a convolutional neural network. For example, input data and weight data can be convolved. The autonomous driving system 170*o* can include a multitude of multiply-accumulate units which perform the convolutions. As an example, the matrix processor can use input and weight data which has been organized or formatted to facilitate larger convolution operations. In an example, input data can be in the form of a three-dimensional matrix or tensor (e.g., two-dimensional data across multiple input channels). In this example, the output data can be across multiple output channels. The autonomous driving system 170*o* can thus process larger input data by merging, or flattening, each two-dimensional output channel into a vector such that the entire, or a substantial portion thereof, channel can be processed by the autonomous driving system 170*o*. As another example, data can be efficiently re-used such that weight data can be shared across convolutions. With respect to an output channel, the weight data described herein can represent weight data (e.g., kernels) used to compute that output channel. Additional example description of the autonomous driving system 170*o*, which can use one or more matrix processors, is included in U.S. Pat. Nos. 11,157,287, 11,409,692, and 11,157,441, which are hereby incorporated by reference in their entirety and form part of this disclosure as if set forth herein.

An airbag activation sensor 170*q* can anticipate or detect a collision and cause the activation or deployment of one or more airbags. The airbag activation sensor 170*q* can transmit data regarding the deployment of an airbag, including data associated with the event causing the deployment.

Referring back to FIG. 1A, the administrator computing device 120 can represent a computing device operated by a system administrator. The administrator computing device 120 can be configured to display data retrieved or generated by the analytics server 110*a* (e.g., various analytic metrics and risk scores), wherein the system administrator can monitor various models utilized by the analytics server 110*a*, review feedback, and/or facilitate the training of the AI model(s) 110*c* maintained by the analytics server 110*a*.

The ego(s) 140 can be any device configured to navigate various routes, such as the vehicle 140*a* or the robot 140*b*. As discussed with respect to FIGS. 1B-C, the ego 140 can include various telemetry sensors. The egos 140 can also include ego computing devices 141. Specifically, each ego can have its own ego computing device 141. For instance, the truck 140*c* can have the ego computing device 141*c*. For brevity, the ego computing devices are collectively referred to as the ego computing device(s) 141. The ego computing devices 141 can control the presentation of content on an infotainment system of the egos 140, process commands associated with the infotainment system, aggregate sensor data, manage communication of data to an electronic data source, receive updates, and/or transmit messages. In one configuration, the ego computing device 141 communicates with an electronic control unit. In another configuration, the ego computing device 141 is an electronic control unit. The ego computing devices 141 can comprise a processor and a non-transitory machine-readable storage medium capable of performing the various tasks and processes described herein. For example, the AI model(s) 110*c* described herein can be stored and performed (or directly accessed) by the ego computing devices 141. Non-limiting examples of the ego computing devices 141 can include a vehicle multimedia and/or display system.

In one example of training AI models 110*c*, the analytics servers 110*a* can collect data from egos 140 to train the AI model(s) 110*c*. Before executing the AI model(s) 110*c* to generate or predict a graph defining lane segments, the analytics server 110*a* can train the AI model(s) 110*c* using various methods. The training allows the AI model(s) 110*c* to ingest data from one or more cameras of one or more egos 140 (without the need to receive radar data) and predict occupancy data for the ego's surroundings. The operation described in this example can be executed by any number of computing devices operating in the distributed computing system described in FIGS. 1A and 1B (e.g., a processor of the egos 140).

To train the AI model(s) 110*c*, the analytics server 110*a* can first employ one or more of the egos 140 to drive a particular route. While driving, the egos 140 can use one or more of their sensors (including one or more cameras) to generate navigation session data. For instance, the one or more of the egos 140 equipped with various sensors can navigate the designated route. As the one or more of the egos 140 traverse the terrain, their sensors can capture continuous (or periodic) data of their surroundings. The sensors can indicate an occupancy status of the one or more egos' 140 surroundings. For instance, the sensor data can indicate various objects having mass in the surroundings of the one or more of the egos 140 as they navigate their route.

In operation, as the one or more egos 140 navigate, their sensors collect data and transmit the data to the analytics server 110*a*, as depicted in the data stream 172. In some embodiments, the one or more egos 140 can include one or more high-resolution cameras that capture a continuous stream of visual data from the surroundings of the one or more egos 140 as the one or more egos 140 navigate through the route. The analytics server 110*a* can then generate a second dataset using the camera feed where visual elements/depictions of different voxels of the one or more egos' 140 surroundings are included within the second dataset. In operation, as the one or more egos 140 navigate, their cameras collect data and transmit the data to the analytics server 110*a*, as depicted in the data stream 172. For instance, the ego computing devices 141 can transmit image data to the analytics server 110*a* using the data stream 172.

The analytics server 110*a* can generate a training dataset using data collected from the egos 140 (e.g., camera feed received from the egos 140). The training dataset can identify or include a set of examples. Each example can identify or include input data and expected output data from the input data. In each example, the input can include the collected data, such as sensor data (e.g., video or image from one or more cameras) and map data (e.g., navigation map) from egos 140. The output can include environment features (e.g., attributes gathered from the sensor data), map features (e.g., attributes in navigation map such as topological features and road layouts), classifications (e.g., a type of topology), and an output token (e.g., a combination of environment features, map features, and classifications) to be included in a graph defining lane segments, among others. In some embodiments, the output can be created by a human reviewer examining the input data.

Using the training dataset, the analytics server 110*a* can feed the series of training datasets to the AI model(s) 110*c* and obtain a set of predicted outputs (e.g., environment features, map features, classifications, and output tokens). The analytics server 110*a* can then compare the predicted data with the ground truth data to determine a difference and train the AI model(s) 110*c* by adjusting the AI model's 110*c* internal weights and parameters proportional to the determined difference according to a loss function. The analytics server 110*a* can train the AI model(s) 110*c* in a similar manner until the trained AI model's 110*c* prediction is accurate to a certain threshold (e.g., recall or precision).

In some embodiments, the analytics server 110*a* can use a supervised method of training. For instance, using the ground truth and the visual data received, the AI model(s) 110*c* can train itself, such that it can predict an output. As a result, when trained, the AI model(s) 110*c* can receive sensor data and map data, analyze the received data, and generate the token. In some embodiments, the analytics server 110*a* can use an unsupervised method where the training dataset is not labeled. Because labeling the data within the training dataset can be time-consuming and can require excessive computing power, the analytics server 110*a* can utilize unsupervised training techniques to train the AI model 110*c*.

With the establishment of the AI model 110*c*, the analytics server 110*a* can transmit, send, or otherwise distribute the weights of the AI model 110*c* to each of the ego computing devices 141*a-c*. Upon receipt, the ego computing device 141*a-c* can store and maintain the AI model 110*c* on a local storage. Once stored and loaded, the ego computing device 141*a-c* can use in processing newly acquired data (e.g., sensor and map data) to create graphs to define lane segments to autonomously navigate the respective ego 140*a-c* through the environment. From time to time, the analytics server 110*a* can transmit, send, or otherwise distribute the updated weights of the AI model 110*c* to update instances of the AI model 110*c* on the ego computing devices 141*a-c*.

Figure 2A:
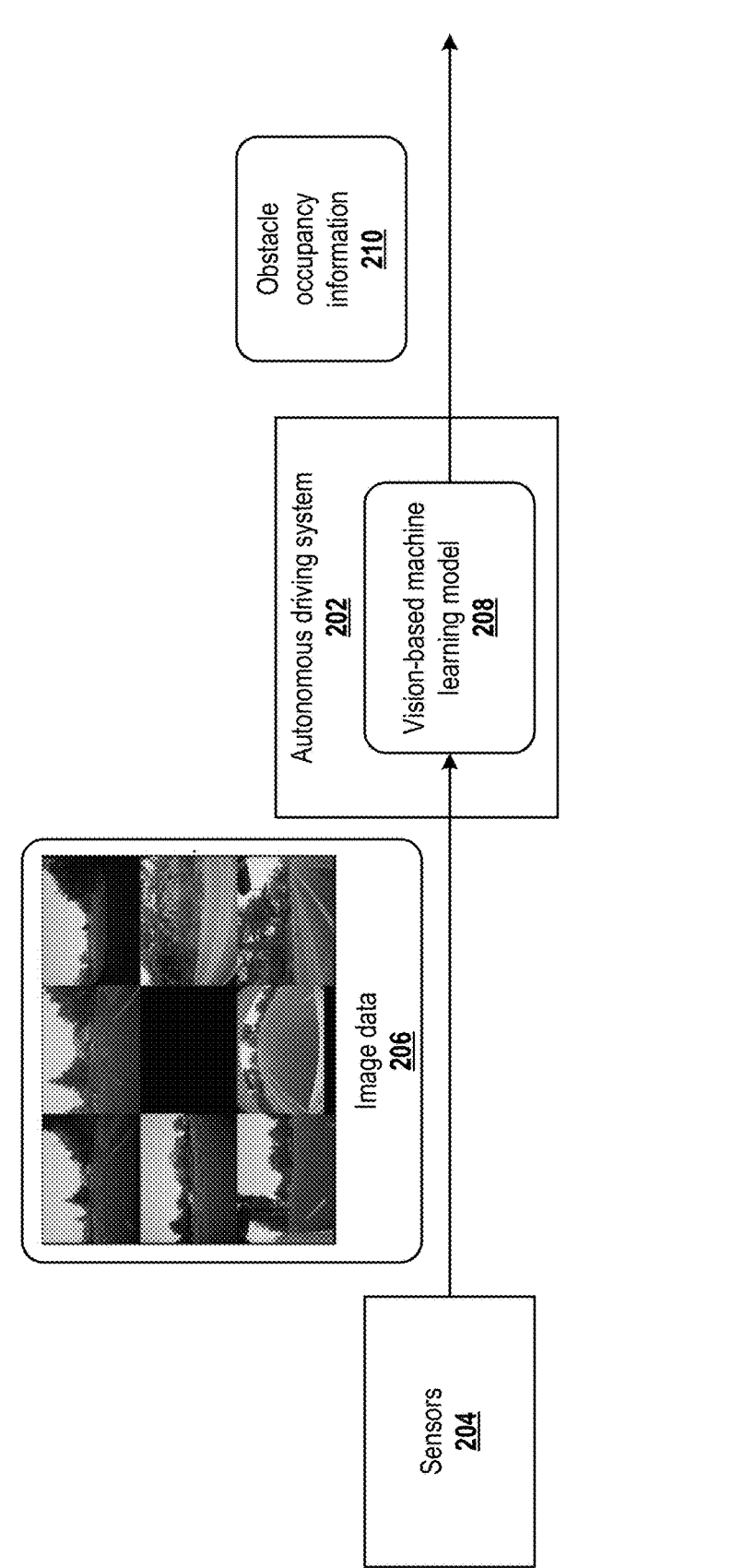
FIG. 2A illustrates a block diagram of an example autonomous driving system outputting obstacle occupancy information, in accordance with an embodiment.

Referring now to FIG. 2A, illustrated is a non-limiting example of an implementation 200a including an autonomous driving system 202 that is configured to determine obstacle occupancy information 210 based on image data 206 that is received from sensors 204 (e.g., sensors that are the same as, or similar to, the cameras 170m, radar 170n, ultrasound sensors 170p, and/or the like). In some embodiments, the autonomous driving system 202 is the same as, or similar to, the autonomous driving system 170o of FIG. 1B.

In some embodiments, the image data 206 includes data associated with one or more images generate by one or more image sensors positioned about an ego (e.g., an ego that is the same as, or similar to, the egos 140 of FIG. 1C). In some embodiments, there can be eight (8) cameras and thus eight (8) images are represented by the image data 206 in FIG. 2A. For example, a top row of the image data 206 includes three images from the forward-facing image sensors (e.g., images from a main camera, a narrow camera, and a fisheye camera); a middle row of the image data 206 includes two images (e.g., images from a camera associated with a left pillar and a right pillar of the egos); and a bottom row of the image data 206 includes three images from the rearward-facing image sensors (e.g., images from a left repeater camera, a right repeater camera, and a backup camera). As described above, the image data 206 can be received at a particular frequency such that the illustrated images represent a particular time stamp of images. In some embodiments, the image data 206 can represent high dynamic range (HDR) images. For example, different exposures can be combined to form the HDR images. As another example, the images from the image sensors can be pre-processed to convert them into HDR images (e.g., using a machine learning model).

In some embodiments, one or more of the sensors 204 (e.g., cameras) can obtain multiple exposures each with a different shutter speed or integration time. For example, the different integration times can be greater than a threshold time difference apart. In this example, there can be three integration times which are about an order of magnitude apart in time. The autonomous driving system 202, or a different computing device associated with the egos, can be configured to determine (e.g., select) one of the exposures based on measures of clipping associated with images. In some embodiments, the autonomous driving system 202, or a different computing device, can form an image based on a combination of the multiple exposures. For example, the autonomous driving system 202 can select each pixel of the formed image from one of the multiple exposures based on the pixel including or not including values (e.g., red, green, blue) which are clipped (e.g., exceed a threshold pixel value).

The autonomous driving system 202 can execute a vision-based machine learning model 208 (which can be the same as, or similar to, the occupancy network 217 described herein) to process the image data 206. An example of the vision-based machine learning model 208 described with respect to an occupancy network 217 is described in more detail with respect to FIGS. 2B and 2C.

As described herein, the vision-based machine learning model 208 can combine information included in the images. For example, each image can be provided to a particular backbone portion. In some embodiments, the backbone portions can represent convolutional neural networks which extract features (e.g., high-dimensional features in image space). In some examples, outputs of these backbone networks can be combined (e.g., formed into a tensor) or can be provided as separate tensors to one or more further portions of the model. In some embodiments, an attention portion (e.g., a cross-attention portion) can receive the combination of features. The attention portion can query three-dimensional (3D) points to determine whether each 3D point is occupied or not. In some embodiments, the attention portion produces 3D occupancy features and can be provided, for example, to an upsampling portion (e.g., deconvolutions) to produce denser features.

The combined output, as will be described, can then be used to determine disparate obstacle occupancy information 210 associated with a real-world environment. Example occupancy information 210 can include a first vector, or other data structure, that includes a threshold number of elements each corresponding to a portion of space about the egos in which the autonomous driving system 202 is installed and/or implemented. For example, each portion of space can represent an angular range (e.g., 3 degrees, 5 degrees, 6 degrees, and/or the like) extending from the egos in which the autonomous driving system 202 is implemented or installed. The first vector, or other data structure, can then indicate whether that angular range includes an object. The obstacle occupancy information 210 can further includes a second vector, or other data structure, that indicates distances to objects for the angular ranges. Thus, if there is an object (e.g., a portion of an object) between behind the egos (e.g., 180-185 degrees, assuming 0 degrees is forward) then the first vector will indicate the existence of an object and the second vector will indicate the distance to that portion of the object.

Figure 2B:
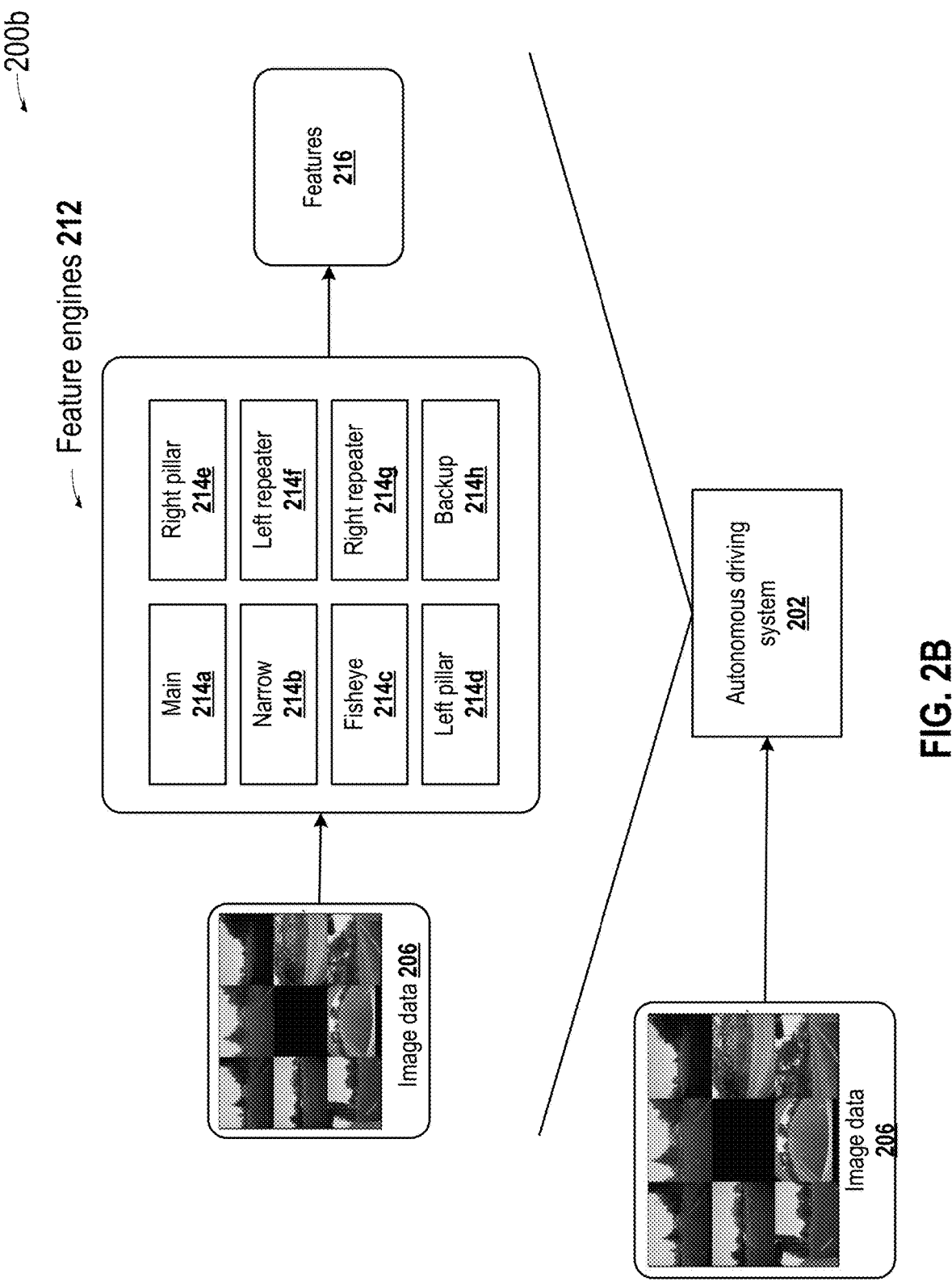
FIGS. 2B-2D illustrate a block diagram of an example implementation of the autonomous driving system of FIG. 2A, in accordance with an embodiment.
Figure 2C:
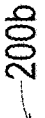
Figure 2D:
Figure 2D:
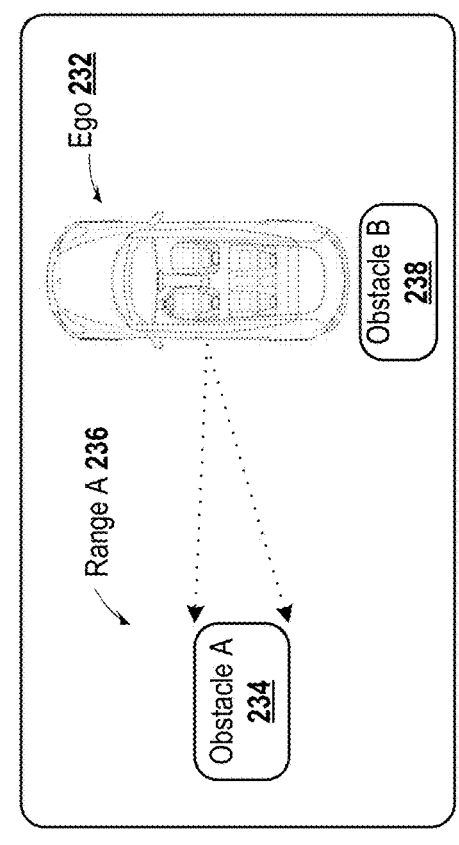
Figure 2D:
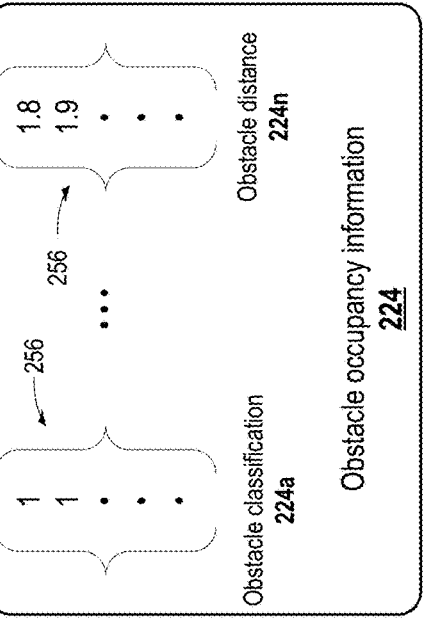
Figure 2D:
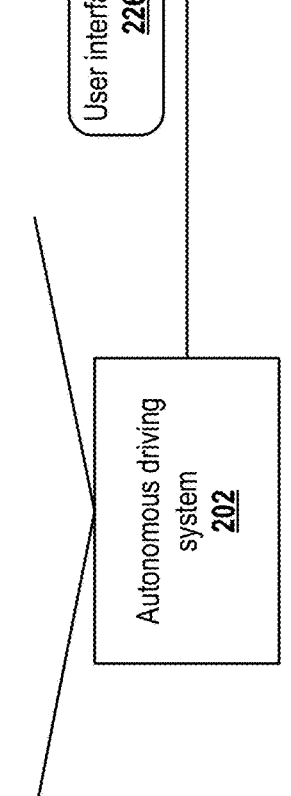

Referring now to FIGS. 2B-2D, illustrated is a non-limiting example of an implementation 200b including the autonomous driving system 202 that is configured to determine obstacle occupancy information 224 based on received image data 206 from the example sensors 204 described herein (e.g., sensors that are the same as, or similar to, cameras 170m, radar 170n, ultrasound sensors 170p, and/or the like). In some embodiments, the autonomous driving system 202 is the same as, or similar to, the autonomous driving system 170o of FIG. 1B. And in some embodiments, the obstacle occupancy information 224 is the same as, or similar to, the obstacle occupancy information 210 of FIG. 2A.

FIGS. 2A-2D include a block diagram illustrating detail of an occupancy network 217 outputting obstacle occupancy information 224. The occupancy network 217 can be executed by one or more systems associated with an ego 140 as described herein. Thus, actions associated with the occupancy network 217 can be understood to be performed by an autonomous driving system 202.

In the illustrated example, images 214a-214h are received by the occupancy network 217. These images 214a-214h can be obtained from image sensors positioned about the ego 140, such as cameras 170m. The occupancy network 217 includes feature engines 212 (e.g., backbone portions) which receive respective images as input. Thus, the feature engines 212 process the raw pixels included in the images 214a-214h. In some embodiments, the feature engines 212 can be convolutional neural networks. For example, there can be 5, 10, 15, and so on, convolutional layers in each backbone network. In some embodiments, the feature engines 212 can include residual blocks, recurrent neural network-regulated residual networks, and so on. Additionally, the feature engines 212 can include weighted bi-directional feature pyramid networks (BiFPN). Output of the BiFPNs can represent multi-scale features determined based on the images 214a-214h. In some embodiments, Gaussian blur can be applied to portions of the images at training and/or inference time. For example, road edges can be peaky in that they are sharply defined in images. In this example, a Gaussian blur can be applied to the road edges to allow for bleeding of visual information such that they can be detectable by a convolutional neural network.

Additionally, certain of the feature engines 212 can preprocess the images such as performing rectification, cropping, and so on. For example, with respect to cropping, images 214*c* from the fisheye forward-facing lens can be vertically cropping to remove certain elements included on a windshield (e.g., a glare shield).

With respect to rectification, the vehicles described herein can be examples of vehicles which are available to millions, or more, end-users. Due to tolerances in manufacturing and/or differences in use of the vehicles, the image sensors in the vehicles can be angled, or otherwise positioned, slightly differently (e.g., differences in roll, pitch, and/or yaw). Additionally, different models of vehicles can execute the same vision-based machine learning model. These different models can have the image sensors positioned and/or angled differently. The occupancy network 217 described herein can be trained, at least in part, using information aggregated from the vehicle fleet used by end-users. Thus, differences in point of view of the images can be evident due to the slight distinctions between the angles, or positions, of the image sensors in the vehicles included in the vehicle fleet.

Thus, rectification can be performed to address these differences. For example, a transformation (e.g., an affine transformation) can be applied to the images 214*a*-214*h*, or a portion thereof, to normalize the images. In this example, the transformation can be based on camera parameters associated with the image sensors (e.g., cameras 170*m*), such as extrinsic and/or intrinsic parameters. In some embodiments, the image sensors can undergo an initial, and optionally repeated, calibrated step. For example, as a vehicle drives the cameras can be calibrated to ascertain camera parameters which can be used in the rectification process. In this example, specific markings (e.g., road lines) can be used to inform the calibration. The rectification can optionally represent one or more layers of the feature engines 212, in which values for the transformation are learned based on training data.

The feature engines 212 can thus output feature maps (e.g., tensors) which are used downstream in the occupancy network 217. In some embodiments, the output from the feature engines 212 can be combined into a matrix or tensor. In some embodiments, the output can be provided as a multitude of tensors (e.g., eight (8) tensors in the illustrated example). In the illustrated example, the output is referred to as features 216 which is input into the occupancy engine 219. While the feature engines 212 and occupancy engine 219 are illustrated separately, in some embodiments they can form part of the same network or model (e.g., the occupancy network 217). Additionally, in some embodiments the feature engines 212 and occupancy engine 219 can be end-to-end trained.

The occupancy engine 219 can use the features 214 to determine occupancy associated with objects positioned about the vehicle. For example, the occupancy engine 219 can separate the real-world environment into voxels which extend from a ground portion upwards in three-dimensional space. Each voxel can represent a portion of three-dimensional space, such as a cuboid or other three-dimensional shape. An object, or real-world feature, can be represented as a combination of voxels. For example, a truck can be represented as a combination of voxels that form the volume of the truck as it exists in the real-world environment. Similarly, a bollard can be represented as a combination of voxels. Additionally, a curb or sidewalk can be represented as combination of voxels with sufficient detail to determine changes in elevation of the curb (e.g., due to root growth of a tree, a prior earthquake, and so on).

The occupancy engine 219 therefore determines occupancy in three-dimensions based on the input image features from the feature engines 200. The occupancy engine 219 includes a transformer engine 218 that uses query-based attention to determine three-dimensional occupancy features. Output from the transformer engine 218 is provided to the alignment engine 220. To ensure that objects can be tracked as an autonomous vehicle navigates, even while temporarily occluded, the alignment engine 220 queues output from the transformer engine 218. The queued output can be used to track objects by aligning the occupancy features from the queue. For example, the output can be pushed into a queue according to time and/or space. In this example, the time indexing can indicate that the transformer engine 218 stores output based on passage of time (e.g., information is pushed at a particular frequency). Spatial indexing can indicate that the transformer engine 218 stores output based on spatial movement of the vehicle. The alignment engine 220 can additionally include a video module which performs three-dimensional convolutions to track objects. In some embodiments, kinematic information associated with the vehicle can be used as input to the alignment engine 220.

Output from the alignment engine 220 can be provided to the occupancy head 222 to determine obstacle occupancy information 224. Example output from the occupancy head 222 can include an indication of occupancy associated with voxels. Additionally, the obstacle occupancy information 224 can include information indicating the existence of objects in individual angular ranges about the vehicle. The obstacle occupancy information 224 can further include distances from the vehicle to objects in the angular ranges. For example, the obstacle occupancy information 224 can indicate that there is an object within several adjacent angular ranges behind the vehicle (e.g., a bollard). The obstacle occupancy information 224 can further indicate the existence of a curb to the right of the vehicle. As can be appreciated, curbs can be curved, warped, and so on. Thus, the angular ranges can indicate the existence of the curb along with varying distances to the curb.

As described herein, the object obstacle information 224 can be used to render user interfaces that graphically indicate the existence of objects proximate to the vehicle. Example user interfaces are included in FIGS. 4-5B.

Additional detail related to the occupancy network 217 is included in U.S. Prov. Patent App. No. 63/375,199, the contents of which are incorporated herein by reference in their entirety and for all purposes.

The obstacle occupancy information 224 can be generated via a forward pass through the occupancy network 217. In some embodiments, forward passes can be computed at a particular frequency (e.g., 24 Hz, 30 Hz, and/or the like).

Referring now to FIG. 2D, illustrated is a block diagram of detail of the output of the occupancy network 217 which is associated with parking. In the illustrated example, an ego 232 is parking in a parking lot. As described herein, the ego 232 can execute the occupancy network 217 to determine obstacle associated with obstacles. Thus, as the ego 232 drives toward the parking spot the ego 232 is generating occupancy obstacle information 224 associated with obstacles which are visible to the image sensors of the ego 232.

In this way, the ego 232 can detect, at least, obstacle A 234 (e.g., a bollard) and obstacle B 238 (e.g., a parking block or curb stop) as being nearby the ego 232. As can be appreciated, as the ego 232 backs up the rear-facing camera can lose visibility of obstacle B 238 (e.g., the obstacle can be under the camera). However, the occupancy network 217 described herein will adjust the location of the object even when occluded (e.g., based on movement of the ego 232, such as via kinematic information). In this way, the ego 232 can maintain an understanding of the position of the object 238.

In FIG. 2D, obstacle A 234 is positioned to the left of the ego 232. As the ego 232 navigates to a final resting position, the occupancy network 217 will output an obstacle classification vector 224a and an obstacle distance vector 224n. As described above, the obstacle classification vector 224a can indicate the existence of an object (e.g., a binary classification) positioned in an angular range which is optionally closer than a threshold distance from the ego 232 (e.g., 3 meters, 4 meters, 7 meters, and/or the like). The obstacle distance vector 224n can indicate a distance to the object positioned in the angular range. As illustrated, obstacle A 234 is within range A 234. Thus, vector 224n indicates that for range A 234 there is an object. Similarly, obstacle distance vector 224n indicates a range to the obstacle A 234. In some embodiments, the vectors 224a-224n can have a particular number of elements (e.g., 70 elements, 71 elements, 72 elements, and/or the like).

The ego 232 can include a display which includes a graphical representation of the obstacle occupancy information 224. For example, the graphical representation (referred to as graphical user interface (GUI) 230) can include a contour positioned about a graphical representation of the ego 232, with the contour being adjusted in color based on the proximity of the ego 232 to objects. As an example with respect to FIG. 2D, the contour would have colors reflecting close proximity to the parking bollards and the parking block in the angular regions for which the obstacles are visible. While the specific colors can be varied and fall within the scope of the disclosure, in some embodiments green can reflect objects which are far away or non-existent and colors closer to red can indicate close objects. The colors can be selected, for example, based on the distances 224n (e.g., distances closer to zero can be a darker shade of red than greater distances). In some embodiments, the contour can be fixed around the vehicle. In some embodiments, the contour can move closer to the vehicle as the vehicle gets closer to an object. The contours described herein can also be other shapes, such as a square, rectangle, polygon, and so on.

The graphical representation can also represent a contour about an exterior of objects which are closer than a threshold distance to the vehicle (e.g., 3 meters, 4 meters, 7 meters, and/or the like). For example, the display can include a graphical representation of the ego 232 along with representations of objects which are within the threshold distance. The contour can thus be positioned along an exterior of the objects and colored as described above. For example, and with respect to FIG. 2D, a first contour can be positioned along the exterior of obstacle A 234, a second contour can be positioned along obstacle B 256, and so on. Since graphical representations of these objects 234, 238 will be presented via the display, the driver will see a representation of their vehicle's position with reference to the objects 234,

238. Additionally, the driver can use the contour to quickly ascertain how close the vehicle is to the represented objects.

Figure 3:
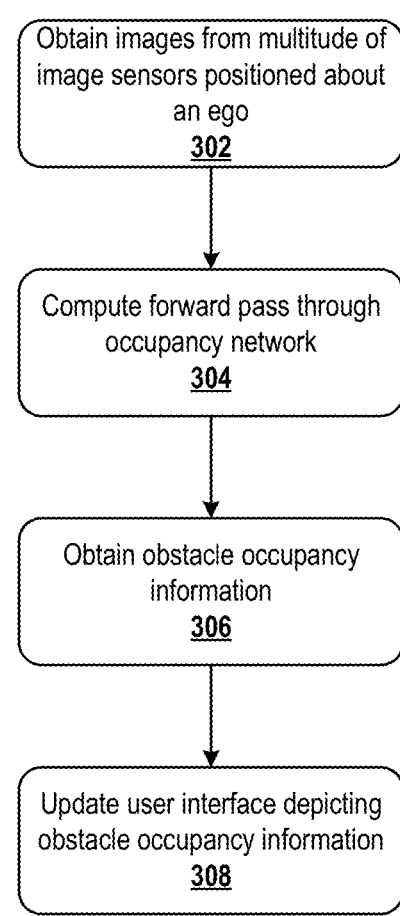
FIG. 3 is a flowchart of an example process for updating a user interface to depict obstacle occupancy information, in accordance with an embodiment.

Referring now to FIG. 3, illustrated is a non-limiting example of a process 300 for updated a user interface to depict obstacle occupancy information. The process 300 is illustrated as a block diagram and includes detail of the example birds-eye view network. For convenience, the process 300 will be described as being performed by a system referred to as an autonomous driving system (e.g., an autonomous driving system that is the same as, or similar to, the autonomous driving system 170o of FIG. 1B and/or the autonomous driving system 202). In some embodiments, the autonomous driving system can be included in and/or implemented by one or more devices of, an ego that is the same as, or similar to, the egos 140.

At operation 302, the autonomous driving system obtains images from multitude of image sensors positioned about an ego. As described above, there can be 7, 8, 10, and and/or the like image sensors (e.g., cameras) used to obtain images.

At operation 304, the autonomous driving system computes a forward pass-through the occupancy network. As described with respect to FIGS. 2A-2D, the occupancy network determines occupancy of objects in a real world-environment.

At operation 306, the autonomous driving system obtains obstacle occupancy information. The obstacle occupancy information includes, for example, an indication of voxels which form objects proximate to the vehicle. The information further includes, as described herein, indications of objects within different angular ranges about the vehicle along with distances to the objects.

At operation 308, the autonomous driving system updates a user interface depicting obstacle occupancy information. As described with respect to FIG. 2D, the autonomous driving system renders a user interface which depicts the obstacle occupancy information. For example, a contour about the vehicle or about an object can be included which is colored based on the vehicle's proximity to one or more objects. As the vehicle moves the contour can be adjusted in color. The contour can be positioned, for example, about the vehicle. The contour or contours can also be positioned, for example, about objects close the vehicle. For this example, the system can render the contour about an exterior of an object. Thus, the contour can be depicted along one side of an object with the side being that which is closest to the vehicle.

As described above, the contour can be updated based on movement of the vehicle. For example, movement can cause the vehicle to become closer to, or further from, nearby objects. Additionally, the contour can be updated based on time via monitoring positions of nearby objects. Thus, if the vehicle is parking and another vehicle is moving at the same time the contour can be updated in real-time to reflect the updated proximity of the other vehicle.

Referring now to FIGS. 4-5B, illustrated are non-limiting examples of user interfaces 400, 500 that can be presented via a display screen (e.g., a display screen that is the same as, or similar to, the display screen 228 of FIG. 2D) of an ego (e.g., an ego that is the same as, or similar to, the egos 140 of FIG. 1A. For example, the display screen can be positioned such that it is visible by a driver of the ego. In some embodiments, the ego can autonomously navigate or perform semi-autonomous actions such as parking the vehicle while the driver is located inside outside of the vehicle. In these embodiments, a mobile application on a computing device associated with the driver (e.g., a phone, tablet, and/or the like), can include the user interfaces 400 and 500. In this way, the driver can view a representation of the vehicle's actions.

With continued reference to FIG. 4, a user interface 400 depicts occupancy proximate to an ego 402 while parking. In the illustrated embodiment, the ego 402 is parking between two vehicles 408, 410. The user interface 400 depicts a representation of the ego 402 along with the objects nearby, which includes the two vehicles 408, 410. Around the ego 402 is a contour 406 or other graphical shape which is adjusted in color to indicate a proximity to the vehicles 408, 410. For example, the left-most portion can be colored red as that portion is closest to vehicle 410. The upper left portion can be colored orange or yellow as the left-headlight is not as close to vehicle 410. In some embodiments, a closest distance 404 to a nearby object can be included (e.g., 40 inches).

With continued reference to FIG. 5A, a user interface 500 depicts occupancy proximate to an ego 402 while parking. In the illustrated example, a graphical representation of the ego 402 is included (e.g., the vehicle being driven). A vehicle 504 is positioned to the right of the ego 402 along with a contour 506 about the vehicle 504. For example, the contour can be illustrated as stuck or wrapped around the exterior of the vehicle 504. As described herein, the color of the contour 506 can be selected based on the proximity of the ego 402 to vehicle 504.

With continued reference to FIG. 5B, illustrated is the user interface 500 of FIG. 5A updated based on movement of the ego 402. In the illustrated example, the ego 402 moved backwards to perform a parallel parking maneuver. As such, the position of the ego 402 relative to the vehicle 504 is updated. The contour 506 is now included around an exterior of the vehicle 504 and along curb 508. In this way, the driver is able to quickly see how close they are to the curb 508.

Figure 6:
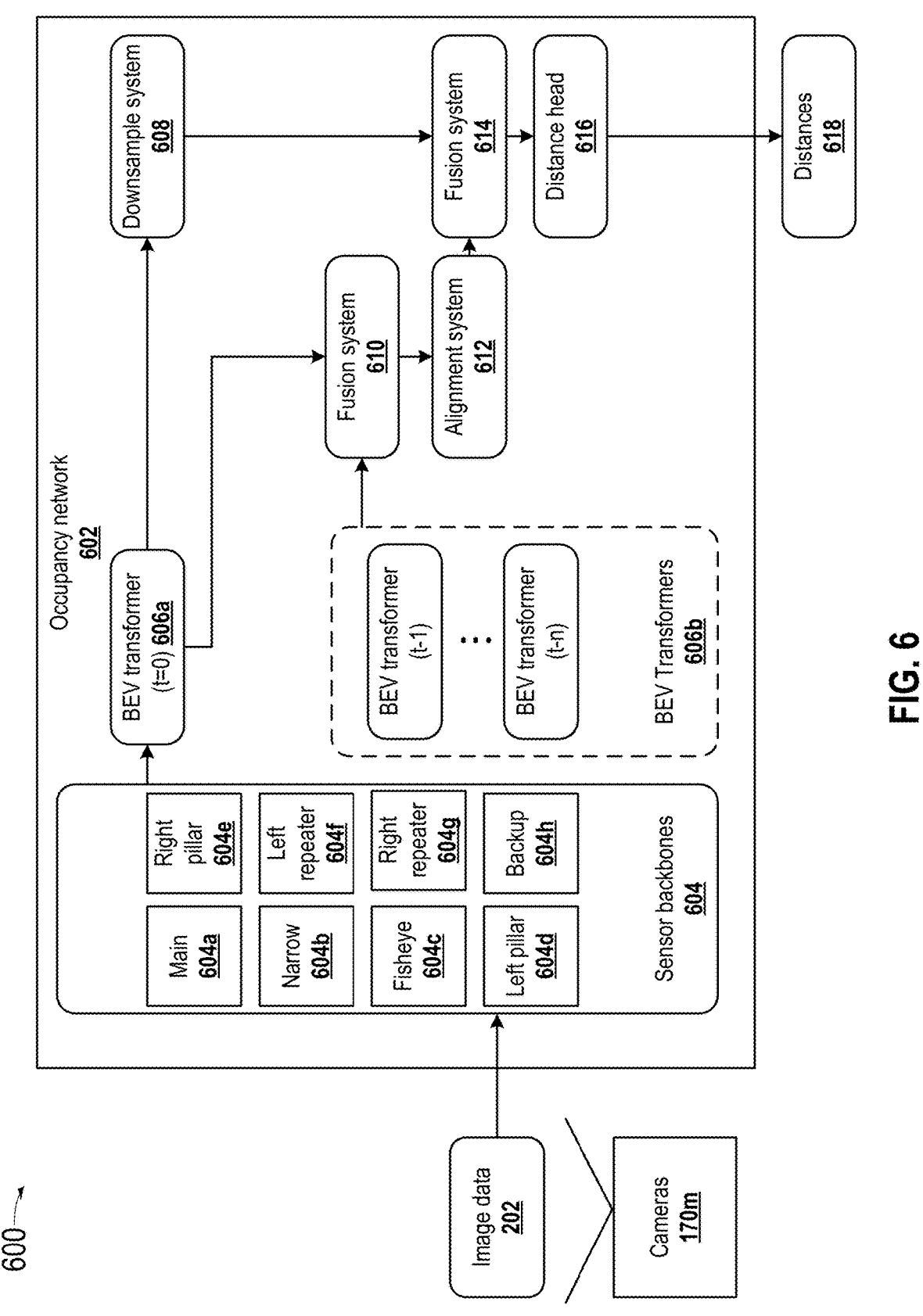
FIG. 6 illustrates a block diagram of an implementation of an occupancy network, in accordance with an embodiment.

Referring now to FIG. 6, illustrated is a non-limiting example of a block diagram of an implementation 600 of an occupancy network 602. The occupancy network 602 can be implemented using any of the components described herein, such as one or more components of an ego (e.g., an ego that is the same as, or similar to, the egos 140 of FIGS. 1A-1C as described herein). In some embodiments, one or more aspects or components of the occupancy network 602 can be the same as, or similar to, one or more aspects or components of the occupancy network 217 of FIG. 2C.

The cameras 170*m* can generate image data 206 as described herein. For example, the cameras 170*m* can generate image data based on operation of one or more egos in an environment. Operation of the egos can include movement of the egos along drivable and/or walkable surfaces from an initial (starting) point to a destination point via one or more intermediate points. As will be understood, such operation can be in accordance with one or more paths through the environment.

The occupancy network 602 can receive the image data 206. For example, the occupancy network 602 can be implemented by a computing device associated with an ego (e.g., by an autonomous driving system 170*o* and/or a vehicle computing device 171 that can be implementing the autonomous driving system 170*o*). In this example, the occupancy network 602 can receive the image data 206 based on generation of the image data 206 by one or more sensors of the ego.

In some embodiments, the occupancy network 602 can provide portions of the image data 206 to one or more corresponding backbones of sensor backbones 604. For example, the occupancy network can include a set of backbones 604*a*-604*h* that are configured to receive sensor data generated by corresponding sensors and process the sensor data to generate features (e.g., values corresponding to one or more features represented by the output of the respective backbones 604*a*-604*h*). In some embodiments, the sensor backbones 604 can be the same as, or similar to, the components of the feature engines 212, and the features generated by the sensor backbones 604 can be the same as, or similar to, the features 216 of FIG. 2B.

In some embodiments, the features output by the sensor backbones 604 can be provided to a birds-eye-view (BEV) transformer 606*a*. For example, the sensor backbones 604 can be provided to the BEV transformer 606*a* to cause the BEV transformer 606*a* to generate an output. The output can include a set of distances to one or more objects within an environment relative to the ego during operation of the ego in the environment. For example, the BEV transformer 606*a* can be trained based on a dataset comprising a plurality of image pairs and corresponding distances to points represented by portions of both images. The output can be associated with a given point in time (e.g., a current point in time, also referred to as time t=0). The output of the BEV transformer 606*a* can then be provided to a downsample system 608. In some embodiments, the output of the BEV transformer 606*a* can also be provided to a fusion system 610.

In some embodiments, the downsample system 608 can receive the data output by the BEV transformer 606*a* and downsample the data. For example, the downsample system 608 can include a neural network (e.g., a convolutional neural network and/or the like) having one or more layers that are configured to downsample the output of the BEV transformer 606*a*. The downsample system 608 can be configured to downsample the output of the BEV transformer 606*a* prior to the downsample system 608 providing the downsampled output to a fusion system 614 described herein.

In some embodiments, the features output by the sensor backbones 604 can be provided to a birds-eye-view (BEV) transformer 606*a* at one or more earlier points in time (time t−1, t−2, and/or the like), and stored and/or retrieved by the occupancy network 602 at a given point in time (e.g., time t=0). For example, the sensor backbones 604 can be provided to the BEV transformer 606*a* at times t−1, t−2, etc. to cause the BEV transformer 606*a* to generate respective outputs. The outputs can include a set of distances to one or more objects within an environment relative to the ego during operation of the ego in the environment at the times t−1, t−2, etc. The output of the BEV transformer 606*a* at the one or more earlier points in time can then be provided to the fusion system 610 to cause the fusion system 610 to combine the output at the one or more earlier points in time with the output of the BEV transformer 606*a* at the current point in time.

In some embodiments, the output of the fusion system 610 can be provided to an alignment system 612 (e.g., a system that can be the same as, or similar to, the alignment engine 220 of FIG. 2C). In some embodiments, the alignment system 612 can include a machine learning model that is configured to obtain the output of the fusion system 610 and update the output of the fusion system 610 based on one or more changes in motion and/or position of the ego vehicle relative to the environment. For example, the alignment system 612 can be configured to receive the output of the fusion system 610 as well as kinematic data associated with motion of the ego at each corresponding point in time (e.g., time t=0, t−1, t−2, etc.). The alignment system 612 can then output an updated set of distances to one or more objects within an environment relative to the ego during operation of the ego in the environment. As such, the alignment system 612 can output the updated set of distances to the one or more objects within an environment relative to the ego during operation of the ego in the environment, where the updated set of distances are refined based on known motion of the ego within the environment. In some embodiments, the output of the alignment system can be downsampled by the alignment system 612 or a separate downsample system (not explicitly illustrated) as described herein with respect to the downsample system 608.

In some embodiments, the output of the downsample system 608 and the alignment system 612 is provided to a fusion system 614. For example, the output of the down-sample system 608 (e.g., the downsampled set of distances to the one or more objects within an environment relative to the ego during operation of the ego in the environment at time t=0) and the output of the alignment system 612 (e.g., the downsampled set of distances to the one or more objects within an environment relative to the ego during operation of the ego in the environment at times prior to time t=0) can be provided to the fusion system 614. The fusion system 614 can include a machine learning model that is configured to receive the output of the downsample system 608 and the alignment system 612 and determine an updated set of distances to one or more objects within an environment relative to the ego during operation of the ego in the environment. The resulting updated set of distances output by the fusion system 614 can then be provided to a distance head 616. The distance head 616 can include a machine learning model that is configured to perform one or more convolutions and output a set of distances 618 between the ego and the one or more objects in the environment.

In some embodiments, the output of the fusion system 614 can be provided to an object prediction network. For example, the output of the fusion system 614 can be provided to an object prediction network including a machine learning model that is configured to receive the output of the fusion system 614 and determine a correspondence between the output of the fusion system 614 and one or more predetermined object types. In this example, the one or more object types can include a vehicle, a truck, another ego, a pedestrian, and/or the like. In some embodiments, the output of the object prediction network can be used to generate a GUI as described herein. For example, the representation of the object when included in a GUI can be determined based on the output of the object prediction network identifying the predetermined object type. In this way, the GUIs described herein can be generated such that they provide a more accurate visual representation of the objects that are being approached (by the egos and/or in relation to the egos).

Figure 7:
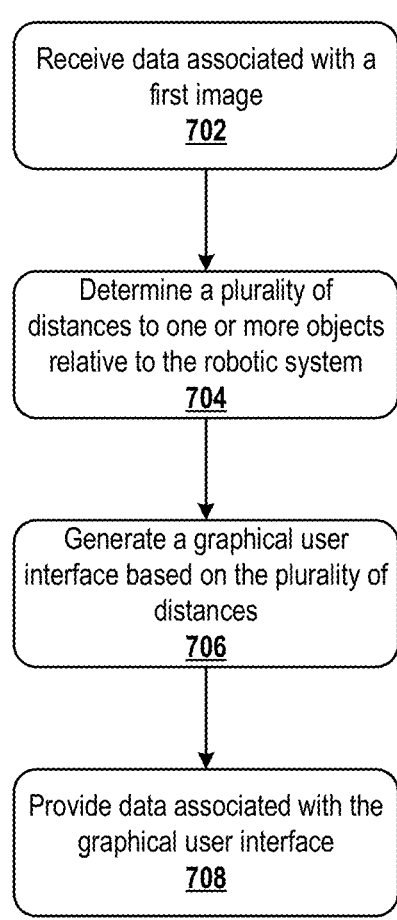
FIG. 7 is a flowchart of an example process for updating a user interface to depict obstacle occupancy information, in accordance with an embodiment.

Referring now to FIG. 7, illustrated is a non-limiting example of a process 700 for generating graphical user interfaces based on distances to objects relative to a robotic system. The process 700 can be implemented using any of the components described herein, such as one or more components of an autonomous driving system (e.g., an analytics server that is the same as, or similar to, the autonomous driving system 170o of FIG. 1B and/or the autonomous driving system 202 of FIGS. 2A-2D). In some embodiments, the autonomous driving system can be implemented by one or more computing devices in one or more egos (e.g., one or more computing devices that are the same as, or similar to, ego computing devices 141a-141c of FIG.

1A). While the process 700 includes operations 702-708 as described herein, other embodiments may include additional or alternative operations or may omit one or more operations.

In some implementations, the process 700 is executed by the autonomous driving system while associated with (e.g., installed in) one or more egos (e.g., egos that are the same as, or similar to, egos 140 of FIGS. 1A-1C). However, one or more steps of the process 700 can be executed by one or more other computing devices separate from, and/or including the autonomous driving systems, such as by an analytics server (e.g., an analytics server that is the same as, or similar to, the analytics server 110a of FIG. 1A), one or more computing devices of at least one vehicle (e.g., one or more computing devices that are the same as, or similar to, the ego computing devices 141a-141c of FIG. 1A), and/or one or more other computing devices operating in a distributed computing system (e.g., a distributed computing system that is the same as, or similar to, the distributed computing system described in FIGS. 1A-C). For instance, one or more computing devices of an ego may locally perform some or all steps described with respect to process 700.

At operation 702, autonomous driving system receives data associated with a first image and a second image. For example, the autonomous driving system can receive data associated with the first image and the second image during operation of a robotic system (referred to as an ego) within an environment. In this example, the ego can also be stationary or moving relative to the environment and one or more objects can be stationary or moving relative to the ego. In some embodiments, the data associated with the first image and the second image can be generated by one or more sensors (e.g., cameras, radar, ultrasound, LiDAR sensors, and/or the like). For example, a first camera can generate the first image and a second camera can generate the second image. In some embodiments, the data associated with the first image is generated by a first sensor and the data associated with the second image is generated by a second sensor, where both the first sensor and the second sensor are positioned on the ego such that the field-of-view of the first sensor and the second sensor at least in part overlap with each other. While the present disclosure is discussed with respect to certain egos, it will be understood that the egos described are not intended to be limiting and that the systems and methods described herein can also be applied to other robotic systems not explicitly discussed.

At operation 704, the autonomous driving system determines a plurality of distances to one or more objects relative to the ego based on the first image and the second image. For example, the autonomous driving system can determine the plurality of distances based on an occupancy network as described herein with respect to FIGS. 2A-2D and/or FIG. 6. In these examples, the autonomous driving system can provide the data associated with the first image and the second image to the occupancy network to cause the occupancy network to perform a forward pass through the occupancy network. The occupancy network can generate an output based on the forward pass. For example, the occupancy network can generate an output based on the forward pass, where the output comprises data associated with an indication of one or more angular ranges, from a point along the ego to the one or more objects, one or more distances to the points along the one or more objects, and/or the like. In this way, the autonomous driving system can cause the occupancy network to output one or more distances to one or more points along the surface of the objects relative to the ego.

At operation 706, the autonomous driving system generates a graphical user interface (GUI) based on the plurality of distances. For example, the autonomous driving system can generate the GUI based on the plurality of distances corresponding to the one or more objects relative to the ego. In this example, the GUI can include a representation of the ego and representations of the one or more objects positioned relative to the ego within the environment in which the ego is operating. An example of a GUI is discussed above with respect to FIGS. 4-5B. In the examples described, the autonomous driving system can generate the GUI based on the autonomous driving system determining the representation of the ego as being fixed relative to the GUI (e.g., the ego can be placed in the center or along a side portion of the GUI) and subsequently determining the position of the objects relative to the ego.

In some embodiments, the autonomous driving system determines a contour associated with each object of the one or more objects. For example, the autonomous driving system can determine the contour based on the distances corresponding to each object of the one or more objects positioned relative to the ego, the distances representing the relative position of one or more points along the surface of each object relative to the ego. In some embodiments, the autonomous driving system determines a placement of the contour relative to the object associated with the contour. For example, the autonomous driving system can determine the placement of the contour relative to the object associated with the contour based on the autonomous driving system determining a position of the respective objects relative to the ego. The autonomous driving system can then match the contour to the corresponding portion of the surface of the respective objects and determine the placement of the contour when included in the GUI. The autonomous driving system can then generate the GUI based on the contour and the placement of the contour relative to corresponding objects in the environment.

In some embodiments, the autonomous driving system can determine a contour profile for the contour. For example, the autonomous driving system can determine the contour profile for a given object based on the position of the object and the contour relative to the ego. In an example, the autonomous driving system can determine the contour profile for the contour based on the plurality of distances corresponding to the object to which the contour is matched. In some embodiments, the autonomous driving system can determine one or more aspects of the contour profile based on the plurality of distances, where the contour profile is continuous and adjusts as portions of the contour change in distance relative to a portion of the ego. As an example, where points along a contour are successively increasing in distance relative to at least one point along the ego, the autonomous driving system can determine one or more colors or shades forming a gradient that changes in proportion to the change in distance (e.g., where closer distances correspond to darker shades or colors and successively farther distances correspond to lighter shades or colors). In another example, where the points along the contour are successively increasing in distance relative to at least one point along the ego, the autonomous driving system can determine one or more colors or shades for sections of the contour that changes in proportion to the change in distance (e.g., where closer sections of the contour correspond to darker shades or colors and successively farther sections of the contour correspond to lighter shades or colors).

In some embodiments, the autonomous driving system determines whether one or more of the distances to the objects relative to the ego satisfies a threshold range of distances. For example, the autonomous driving system can determine the distances to the objects relative to the ego and then compare the distances to a threshold range of distances. The threshold range can include, for example, a range including a lower bound (e.g., 5 centimeters, 4 centimeters, and/or the like) and/or an upper bound (e.g., 100 centimeters, 125 centimeters, and/or the like). In this example, the autonomous driving system can generate the GUI based on whether the distances to the objects relative to the ego satisfies the threshold range. For example, the autonomous driving system can determine that the distances satisfy the threshold range (e.g., satisfy the lower and/or an upper bound) and generate the GUI as described herein based on the plurality of distances corresponding to the object. In another example, the autonomous driving system can determine that the distances do not satisfy the threshold range (e.g., do not satisfy the lower or upper bound) and generate the GUI as described herein by forgoing use of the distances that do not satisfy the threshold range. In this way, the autonomous driving system can forgo generating the GUI to include objects that are outside of the threshold range.

In some embodiments, the autonomous driving system determines that one or more audible tones (e.g., chimes) are to be output based on the one or more distances between the ego and the object. For example, as the ego approaches the object, the autonomous driving system can determine that a distance between the ego and the objects relative to the ego are reducing (e.g., the ego and/or the objects relative to the ego are moving closer to one another). The autonomous driving system can then identify an audible tone or a series of audible tones to be output by a user interface (e.g., speakers) of the ego based on the distance. For example, the autonomous driving system can determine that an individual chime, a series of chimes, and/or the like are to be output by the speakers. Additionally, or alternatively, the autonomous driving system can determine a pattern associated with the audible tones to be output based on the one or more distances. For example, the autonomous driving system can determine a pattern of tones that include a set of tones that increase in frequency and/or volume as the ego and/or objects relative to the ego move closer to one another. In some embodiments, the autonomous driving system can then provide data associated with the audible tone or the series of audible tones to the speakers or a computing device controlling the speakers to cause the speakers to output the tone or series of audible tones.

In some embodiments, the autonomous driving system determines whether one or more of the distances to the objects relative to the ego indicates that a height of the objects corresponding to the distances satisfies a threshold range of heights. For example, the autonomous driving system can determine the height of the objects relative to the ego based on the plurality of distances corresponding to the objects and then compare the height to a threshold range of heights. The threshold range of heights can include, for example, a range including a lower bound (e.g., 5 centimeters, 4 centimeters, and/or the like) and/or an upper bound (e.g., 100 centimeters, 125 centimeters, and/or the like). In this example, the autonomous driving system can generate the GUI based on whether the heights of the objects satisfy the threshold range of heights. For example, the autonomous driving system can determine that the distances satisfy the threshold range of heights (e.g., satisfy the lower and/or an upper bound) and generate the GUI as described herein based on the plurality of distances corresponding to the object. In another example, the autonomous driving system can determine that the distances do not satisfy the threshold range of heights (e.g., do not satisfy the lower or upper bound) and generate the GUI as described herein by forgoing use of the distances that do not satisfy the threshold range. In this way, the autonomous driving system can forgo generating the GUI to include objects that are outside of the threshold range such as, for example, ramps, curbs, or parking garage ceilings which the body of the ego can be incapable of contacting through lateral or longitudinal movement.

At operation 708, the autonomous driving system can provide data associated with the GUI to cause the GUI to be displayed. For example, the autonomous driving system can provide data associated with the GUI to a display screen such as a user interface of the ego (e.g., a user interface that is the same as, or similar to, the user interface 170*a* of FIG. 1B. The data associated with the GUI can be configured to cause one or more processors associated with the display screen to display the GUI. For example, the autonomous driving system can provide the data associated with the GUI to the display screen while the ego is moving at a predetermined speed (e.g., 0 miles per hour (mph), less than 5 mph, less than 10 mph, and/or the like). In another example, the autonomous driving system can provide the data associated with the GUI to the display screen during operation of the ego. In this example, the autonomous driving system can provide the data associated with the GUI to the display screen during operation of the ego in response to the autonomous driving system receiving input from a user (e.g., an individual operating the ego) indicating a request to display the GUI including the contour. In some embodiments, the autonomous driving system can provide the data associated with the GUI to the display screen in response to the autonomous driving system determining that the one or more distances satisfies a minimum distance threshold. For example, as the ego approaches, or is approached by, the one or more objects and the distance between the ego and the objects is successively reduced, the autonomous driving system can determine that the minimum distance threshold is satisfied and provide the data associated with the GUI to cause the GUI to be displayed in response to satisfaction of the minimum distance threshold.

All of the processes described herein can be embodied in, and fully automated, via software code modules executed by a computing system that includes one or more computers or processors. The code modules can be stored in any type of non-transitory computer-readable medium or other computer storage device. Some or all the methods can be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor can also include primarily analog components. For example, some or all of the signal processing algorithms described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "can," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., can be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions can be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Some embodiments of the present disclosure are described herein in connection with a threshold or a range of thresholds. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It should be emphasized that many variations and modifications can be made to the above-described embodiments, the elements of which are to be understood as being among other acceptable examples. All such modifications and variations are intended to be included herein within the scope of this disclosure.

What is claimed is:

1. A system comprising:

one or more processors configured to:

receive data associated with a first image and a second image, the data associated with the first image and the second image generated by one or more sensors of an ego;

determine a plurality of distances to one or more objects relative to the ego based on the first image, the second image, and an occupancy network, the occupancy network configured to receive the data associated with the first image and the second image as input and, in response to execution of the occupancy network on the first image and the second image, output the plurality of distances to the one or more objects relative to the ego;

generate a graphical user interface based on the plurality of distances to the one or more objects relative to the ego, the graphical user interface comprising a representation of the ego, a contour interposed between the representation of the ego and the one or more objects, and the one or more objects positioned relative to the ego;

provide data associated with the graphical user interface to at least one processor associated with a display screen, the data associated with the graphical user interface configured to cause the at least one processor to display the graphical user interface on the display screen;

and control operation of the ego based on the plurality of distances to the one or more objects.

2. The system of claim 1, wherein the one or more processors configured to generate the graphical user interface are configured to:

determine the contour, where the contour indicates a relationship of a portion of each of the one or more objects positioned relative to the ego;

determine a placement of the contour relative to respective objects of the one or more objects positioned relative to the ego; and generate the graphical user interface based on the contour and the placement of the contour relative to the respective objects.

3. The system of claim 2, wherein the one or more processors configured to determine the contour are configured to:

determine the contour of the portion of each of the one or more objects based on the distances of the plurality of distances corresponding to each object of the one or more objects.

4. The system of claim 3, wherein the one or more processors configured to determine the contour are configured to:

determine a contour profile for the contour of the portion of each of the one or more objects positioned relative to the ego based on the plurality of distances corresponding to each object of the one or more objects.

5. The system of claim 3, wherein the one or more processors configured to determine the contour are configured to:

determine a contour profile for the contour of the portion of each of the one or more objects positioned relative to the ego based on the plurality of distances corresponding to each object of the one or more objects, each contour profile represented as a gradient.

6. The system of claim 3, wherein the one or more processors configured to determine the plurality of distances to one or more objects relative to the ego are configured to:

determine a subset of distances of the plurality of distances satisfies a threshold range of distances, and wherein the one or more processors configured to generate the graphical user interface based on the plurality of distances to the one or more objects relative to the ego are configured to:

generate the graphical user interface based on the plurality of distances to the one or more objects that satisfy the threshold range of distances.

7. The system of claim 6, wherein the one or more processors configured to generate the graphical user interface based on the plurality of distances to the one or more objects relative to the ego are configured to:

forgo generating the graphical user interface based on the plurality of distances to the one or more objects that do not satisfy the threshold range of distances.

8. The system of claim 3, wherein the one or more processors configured to determine the plurality of distances to one or more objects relative to the ego are configured to:

determine a height for each distance of the plurality of distances based on the first image and the second image; and determine that the height for each distance of the plurality of distances satisfies a threshold range of heights, and wherein the one or more processors configured to generate the graphical user interface based on the plurality of distances to the one or more objects relative to the ego are configured to:

generate the graphical user interface based on the plurality of distances to the one or more objects that are associated with heights that satisfy the threshold range of heights.

9. The system of claim 8, wherein the one or more processors configured to generate the graphical user interface based on the plurality of distances to the one or more objects that are associated with heights that satisfy the threshold range of heights are configured to:

forgo generating the graphical user interface based on the plurality of distances to the one or more objects that are associated with heights that do not satisfy the threshold range of heights.

10. A method, comprising:

receiving, by at least one processor, data associated with a first image and a second image, the data associated with the first image and the second image generated by one or more sensors of an ego;

determining, by the at least one processor, a plurality of distances to one or more objects relative to the ego based on the first image and the second image based on an output generated by an occupancy network in response to execution of the occupancy network on the first image and the second image;

generating, by the at least one processor, a graphical user interface based on the plurality of distances to the one or more objects relative to the ego, the graphical user interface comprising a representation of the ego, a contour interposed between the representation of the ego and the one or more objects, and the one or more objects positioned relative to the ego;

providing, by the at least one processor, data associated with the graphical user interface to at least one processor associated with a display screen, the data associated with the graphical user interface configured to cause the at least one processor to display the graphical user interface on the display screen; and controlling, by the at least one processor, operation of the ego based on the plurality of distances to the one or more objects.

11. The method of claim 10, wherein generating the graphical user interface comprises:

determining, by the at least one processor, a contour of a portion of each of the one or more objects positioned relative to the ego;

determining, by the at least one processor, a placement of the contour relative to respective objects of the one or more objects positioned relative to the ego; and generating, by the at least one processor, the graphical user interface based on the contour and the placement of the contour relative to the respective objects.

12. The method of claim 11, wherein determining the contour comprises:

determining, by the at least one processor, the contour of the portion of each of the one or more objects based on the distances of the plurality of distances corresponding to each object of the one or more objects.

13. The method of claim 12, wherein determining the contour comprises:

determining, by the at least one processor, a contour profile for the contour of the portion of each of the one or more objects positioned relative to the ego based on the plurality of distances corresponding to each object of the one or more objects.

14. The method of claim 12, wherein determining the contour comprises:

determining, by the at least one processor, a contour profile for the contour of the portion of each of the one or more objects positioned relative to the ego based on the plurality of distances corresponding to each object of the one or more objects, each contour profile represented as a gradient.

15. The method of claim 12, wherein determining the plurality of distances to one or more objects relative to the ego comprises:

determining, by the at least one processor, a subset of distances of the plurality of distances satisfies a threshold range of distances, and wherein generating the graphical user interface based on the plurality of distances to the one or more objects relative to the ego comprises:

generating, by the at least one processor, the graphical user interface based on the plurality of distances to the one or more objects that satisfy the threshold range of distances.

16. The method of claim 15, wherein generating the graphical user interface based on the plurality of distances to the one or more objects relative to the ego comprises:

forgoing generating the graphical user interface based on the plurality of distances to the one or more objects that do not satisfy the threshold range of distances.

17. The method of claim 12, wherein determining the plurality of distances to one or more objects relative to the ego comprises:

determining, by the at least one processor, a height for each distance of the plurality of distances based on the first image and the second image; and determining, by the at least one processor, that the height for each distance of the plurality of distances satisfies a threshold range of heights, and wherein generating the graphical user interface based on the plurality of distances to the one or more objects relative to the ego comprises:

generating, by the at least one processor, the graphical user interface based on the plurality of distances to the one or more objects that are associated with heights that satisfy the threshold range of heights.

18. The method of claim 17, wherein generating the graphical user interface based on the plurality of distances to the one or more objects that are associated with heights that satisfy the threshold range of heights comprises:

forgoing, by the at least one processor, generating the graphical user interface based on the plurality of distances to the one or more objects that are associated with heights that do not satisfy the threshold range of heights.

19. A method, comprising:

obtaining, by at least one processor, images from a multitude of image sensors positioned about a vehicle;

computing, by the at least one processor, a forward pass through an occupancy network to output, at least, information reflecting, for individual angular ranges about the vehicle, whether an object is within a threshold distance of the vehicle for an individual range along with an estimated distance to the object;

in response to execution of the occupancy network, causing, by the at least one processor, presentation, via a display of the vehicle, of a user interface depicting a graphical representation of the vehicle and the information reflecting whether the object is within a threshold distance of the vehicle as a contour interposed between the graphical representation of the vehicle and a graphical representation of the object; and controlling, by the at least one processor, operation of the vehicle based on whether the object is within the threshold distance.

20. The method of claim 19, wherein the graphical representation of the output information includes a contour positioned about the vehicle.

* * * * *